US012632177B2

(12) United States Patent

Yoshihara et al.

(10) Patent No.:     US 12,632,177 B2

(45) Date of Patent:          May 19, 2026

(54) MEMORY SYSTEM IMPLEMENTING WRITE ABORT OPERATION FOR REDUCED READ LATENCY

(71) Applicant: SUNRISE MEMORY CORPORATION, San Jose, CA (US)

(72) Inventors: Masahiro Yoshihara, Yokohama (JP); Tz-Yi Liu, Palo Alto, CA (US); Raul Adrian Cernea, Santa Clara, CA (US); Shay Fux, Kfar Yona (IL); Erez Landau, Netanya (IL); Sagie Goldenberg, Gaaton (IL)

(73) Assignee: SUNRISE MEMORY CORPORATION, San Jose, CA (US)

( * ) Notice:   Subject to any disclaimer, the term of this patent is extended or adjusted under 35 U.S.C. 154(b) by 22 days.

(21) Appl. No.: 18/059,971

(22) Filed:      Nov. 29, 2022

(65)               Prior Publication Data

US 2023/0195314 A1      Jun. 22, 2023

Related U.S. Application Data

(60) Provisional application No. 63/287,786, filed on Dec. 9, 2021.

(51) Int. Cl.
   G06F 3/06              (2006.01)
(52) U.S. Cl.
   CPC .......... G06F 3/0611 (2013.01); G06F 3/0659 (2013.01); G06F 3/0673 (2013.01)
(58) Field of Classification Search
   CPC .... G06F 3/0611; G06F 3/0659; G06F 3/0673; G11C 16/102; G11C 16/14; G11C 16/26;
   (Continued)

(56)                References Cited

U.S. PATENT DOCUMENTS

| 4,213,139 A | 7/1980 | Rao |
| 4,984,153 A | 1/1991 | Kregness et al. |

(Continued)

FOREIGN PATENT DOCUMENTS

| CN | 107658317 A | 2/2018 |
| CN | 108649031 A | 10/2018 |

(Continued)

OTHER PUBLICATIONS

"EP Extended Search Report EP168690149.3", Oct. 18, 2019.

(Continued)

*Primary Examiner* — Kenneth M Lo

(57)                ABSTRACT

A memory system including a memory device of storage transistors organized in multiple memory banks where the memory device interacts with a controller device to perform read and write operations. In some embodiments, the controller device is configured to issue to the memory device a write command and a write termination command, where the write command causing the memory device to initiate a write operation in the memory device and the write termination command causing the memory device to terminate the write operation. In one embodiment, the controller device issues a write abort command as the write termination command to terminate a write operation in progress at a certain memory bank of the memory device in order to issue a read command to read data from the same memory bank. The terminated write operation can resume after the completion of the read operation.

38 Claims, 17 Drawing Sheets

(58) Field of Classification Search
    CPC ..... G11C 16/32; G11C 16/3418; G11C 16/08;
                        G11C 2216/20; G11C 16/10
    See application file for complete search history.

(56)                  References Cited

U.S. PATENT DOCUMENTS

| | | | |
|---|---|---|---|
| 5,388,246 | A | 2/1995 | Kasai |
| 5,583,808 | A | 12/1996 | Brahmbhatt |
| 5,646,886 | A | 7/1997 | Brahmbhatt |
| 5,656,842 | A | 8/1997 | Wamatsu |
| 5,768,192 | A | 6/1998 | Eitan |
| 5,789,776 | A | 8/1998 | Lancaster et al. |
| 5,915,167 | A | 6/1999 | Leedy |
| 6,040,605 | A | 3/2000 | Sano et al. |
| 6,057,862 | A | 5/2000 | Margulis |
| 6,107,133 | A | 8/2000 | Furukawa |
| 6,118,171 | A | 9/2000 | Davies et al. |
| 6,130,838 | A | 10/2000 | Kim et al. |
| 6,434,053 | B1 | 8/2002 | Fujiwara |
| 6,580,124 | B1 | 6/2003 | Cleeves et al. |
| 6,744,094 | B2 | 6/2004 | Forbes |
| 6,774,458 | B2 | 8/2004 | Fricke et al. |
| 6,873,004 | B1 | 3/2005 | Han et al. |
| 6,881,994 | B2 | 4/2005 | Lee et al. |
| 6,946,703 | B2 | 9/2005 | Ryu et al. |
| 7,005,350 | B2 | 2/2006 | Walker et al. |
| 7,284,226 | B1 | 10/2007 | Kondapalli |
| 7,307,308 | B2 | 12/2007 | Lee |
| 7,489,002 | B2 | 2/2009 | Forbes et al. |
| 7,524,725 | B2 | 4/2009 | Chung |
| 7,612,411 | B2 | 11/2009 | Walker |
| 8,026,521 | B1 | 9/2011 | Or-Bach et al. |
| 8,139,418 | B2 | 3/2012 | Carman |
| 8,178,396 | B2 | 5/2012 | Sinha et al. |
| 8,417,917 | B2 | 4/2013 | Emma et al. |
| 8,630,114 | B2 | 1/2014 | Lue |
| 8,653,672 | B2 | 2/2014 | Leedy |
| 8,767,473 | B2 | 7/2014 | Shim et al. |
| 8,848,425 | B2 | 9/2014 | Schloss |
| 8,878,278 | B2 | 11/2014 | Alsmeier et al. |
| 9,190,293 | B2 | 11/2015 | Wang et al. |
| 9,202,694 | B2 | 12/2015 | Konevecki et al. |
| 9,230,985 | B1 | 1/2016 | Wu et al. |
| 9,256,026 | B2 | 2/2016 | Thacker et al. |
| 9,297,971 | B2 | 3/2016 | Thacker et al. |
| 9,412,752 | B1 | 8/2016 | Yeh et al. |
| 9,455,268 | B2 | 9/2016 | Oh et al. |
| 9,502,345 | B2 | 11/2016 | Youn et al. |
| 9,620,605 | B2 | 4/2017 | Liang et al. |
| 9,633,944 | B2 | 4/2017 | Kim |
| 9,691,485 | B1 | 6/2017 | Kumar et al. |
| 9,748,172 | B2 | 8/2017 | Takaki |
| 9,799,761 | B2 | 10/2017 | Or-Bach et al. |
| 9,842,651 | B2 | 12/2017 | Harari |
| 9,892,800 | B2 | 2/2018 | Harari |
| 9,911,497 | B1 | 3/2018 | Harari |
| 10,074,667 | B1 | 9/2018 | Higashi |
| 10,096,364 | B2 | 10/2018 | Harari |
| 10,121,553 | B2 | 11/2018 | Harari et al. |
| 10,217,719 | B2 | 2/2019 | Watanabe et al. |
| 10,249,370 | B2 | 4/2019 | Harari |
| 10,254,968 | B1 | 4/2019 | Gazit et al. |
| 10,283,452 | B2 | 5/2019 | Zhu et al. |
| 10,283,493 | B1 | 5/2019 | Nishida |
| 10,319,696 | B1 | 6/2019 | Nakano |
| 10,373,956 | B2 | 8/2019 | Gupta et al. |
| 10,381,370 | B2 | 8/2019 | Shin et al. |
| 10,381,378 | B1 | 8/2019 | Harari |
| 10,395,737 | B2 | 8/2019 | Harari |
| 10,431,596 | B2 | 10/2019 | Herner et al. |
| 10,475,812 | B2 | 11/2019 | Harari |
| 10,622,377 | B2 | 4/2020 | Harari et al. |
| 10,644,826 | B2 | 5/2020 | Wuu et al. |
| 10,651,153 | B2 | 5/2020 | Fastow et al. |
| 10,692,837 | B1 | 6/2020 | Nguyen et al. |
| 10,692,874 | B2 | 6/2020 | Harari et al. |
| 10,725,099 | B2 | 7/2020 | Ware |
| 10,742,217 | B2 | 8/2020 | Dabral et al. |
| 10,978,427 | B2 | 4/2021 | Li et al. |
| 11,152,343 | B1 | 10/2021 | Dokania et al. |
| 11,507,301 | B2 | 11/2022 | Norman |
| 11,513,729 | B1 | 11/2022 | Ben-Yehuda et al. |
| 11,728,004 | B1 | 8/2023 | Ray et al. |
| 11,923,341 | B2 * | 3/2024 | Quader ................. G06F 3/0604 |
| 2001/0030340 | A1 | 10/2001 | Fujiwara |
| 2001/0053092 | A1 * | 12/2001 | Kosaka .............. G11C 16/0466 |
| | | | 365/185.19 |
| 2002/0028541 | A1 | 3/2002 | Lee et al. |
| 2002/0051378 | A1 | 5/2002 | Ohsawa |
| 2002/0193484 | A1 | 12/2002 | Albee |
| 2004/0043755 | A1 | 3/2004 | Shimooka et al. |
| 2004/0214387 | A1 | 10/2004 | Madurawe et al. |
| 2004/0246807 | A1 | 12/2004 | Lee |
| 2004/0262681 | A1 | 12/2004 | Masuoka et al. |
| 2004/0262772 | A1 | 12/2004 | Ramanathan et al. |
| 2005/0128815 | A1 | 6/2005 | Ishikawa et al. |
| 2005/0280061 | A1 | 12/2005 | Lee |
| 2006/0080457 | A1 | 4/2006 | Hiramatsu et al. |
| 2006/0155921 | A1 | 7/2006 | Gorobets et al. |
| 2006/0212651 | A1 | 9/2006 | Ashmore |
| 2007/0192518 | A1 | 8/2007 | Rupanagunta et al. |
| 2007/0236979 | A1 | 10/2007 | Takashima |
| 2008/0022026 | A1 | 1/2008 | Yang et al. |
| 2008/0239812 | A1 | 10/2008 | Naofumi et al. |
| 2009/0057722 | A1 | 3/2009 | Masuoka et al. |
| 2009/0089532 | A1 | 4/2009 | Wang et al. |
| 2009/0157946 | A1 | 6/2009 | Arya |
| 2009/0237996 | A1 | 9/2009 | Kirsch et al. |
| 2009/0279360 | A1 | 11/2009 | Peter et al. |
| 2009/0290442 | A1 | 11/2009 | Rajan |
| 2009/0316487 | A1 | 12/2009 | Lee et al. |
| 2010/0036960 | A1 | 2/2010 | Kowalewski |
| 2010/0121994 | A1 | 5/2010 | Kim et al. |
| 2010/0124116 | A1 | 5/2010 | Takashi et al. |
| 2010/0219392 | A1 | 9/2010 | Awaya et al. |
| 2010/0254191 | A1 | 10/2010 | Son et al. |
| 2011/0115011 | A1 | 5/2011 | Masuoka et al. |
| 2011/0134705 | A1 | 6/2011 | Jones et al. |
| 2011/0170266 | A1 | 7/2011 | Haensh et al. |
| 2011/0208905 | A1 | 8/2011 | Shaeffer et al. |
| 2011/0298013 | A1 | 12/2011 | Hwang et al. |
| 2011/0310683 | A1 | 12/2011 | Gorobets |
| 2012/0182801 | A1 | 7/2012 | Lue |
| 2012/0243314 | A1 | 9/2012 | Takashi |
| 2012/0307568 | A1 | 12/2012 | Banna et al. |
| 2012/0311246 | A1 | 12/2012 | McWilliams et al. |
| 2013/0007349 | A1 | 1/2013 | D'Abreu et al. |
| 2013/0256780 | A1 | 10/2013 | Kai et al. |
| 2014/0015036 | A1 | 1/2014 | Fursin et al. |
| 2014/0032873 | A1 * | 1/2014 | Ozdemir ................. G06F 13/16 |
| | | | 711/202 |
| 2014/0040698 | A1 | 2/2014 | Loh et al. |
| 2014/0052912 | A1 | 2/2014 | Wang et al. |
| 2014/0075135 | A1 | 3/2014 | Choi et al. |
| 2014/0117366 | A1 | 5/2014 | Saitoh |
| 2014/0151774 | A1 | 6/2014 | Rhie |
| 2014/0173017 | A1 | 6/2014 | Takagi et al. |
| 2014/0247674 | A1 | 9/2014 | Karda et al. |
| 2014/0328128 | A1 | 11/2014 | Louie et al. |
| 2014/0340952 | A1 | 11/2014 | Ramaswamy et al. |
| 2015/0121000 | A1 | 4/2015 | Tanzawa |
| 2015/0155876 | A1 | 6/2015 | Jayasena et al. |
| 2015/0179269 | A1 | 6/2015 | Lee |
| 2015/0194440 | A1 | 7/2015 | Noh et al. |
| 2015/0220463 | A1 | 8/2015 | Fluman et al. |
| 2015/0249143 | A1 | 9/2015 | Sano |
| 2015/0263005 | A1 | 9/2015 | Zhao et al. |
| 2015/0347331 | A1 | 12/2015 | Park et al. |
| 2015/0372099 | A1 | 12/2015 | Chen et al. |
| 2015/0378890 | A1 | 12/2015 | Lien et al. |
| 2016/0013156 | A1 | 1/2016 | Zhai et al. |
| 2016/0019951 | A1 | 1/2016 | Park et al. |
| 2016/0035711 | A1 | 2/2016 | Hu |
| 2016/0079164 | A1 | 3/2016 | Fukuzumi et al. |

(56) References Cited

U.S. PATENT DOCUMENTS

| | | |
|---|---|---|
| 2016/0086970 A1 | 3/2016 | Peng |
| 2016/0225860 A1 | 8/2016 | Karda et al. |
| 2016/0248631 A1 | 8/2016 | Duchesneau |
| 2016/0314042 A1 | 10/2016 | Plants |
| 2016/0321002 A1 | 11/2016 | Jung et al. |
| 2017/0031619 A1 | 2/2017 | Luan et al. |
| 2017/0092370 A1 | 3/2017 | Harari |
| 2017/0092371 A1 | 3/2017 | Harari |
| 2017/0148517 A1 | 5/2017 | Harari |
| 2017/0148810 A1 | 5/2017 | Kai et al. |
| 2017/0213821 A1 | 7/2017 | Or-Bach et al. |
| 2017/0236590 A1 | 8/2017 | Gueta et al. |
| 2017/0243638 A1* | 8/2017 | Hsu .................. G11C 11/5642 |
| 2017/0358594 A1 | 12/2017 | Lu et al. |
| 2018/0095127 A1 | 4/2018 | Pappu et al. |
| 2018/0108416 A1 | 4/2018 | Harari |
| 2018/0239720 A1 | 8/2018 | Kanoh |
| 2018/0261575 A1 | 9/2018 | Tagami et al. |
| 2018/0269229 A1 | 9/2018 | Or-Bach et al. |
| 2018/0331042 A1 | 11/2018 | Manusharow et al. |
| 2018/0342302 A1* | 11/2018 | Chang .................. G11C 16/20 |
| 2018/0357165 A1 | 12/2018 | Helmick et al. |
| 2018/0366471 A1 | 12/2018 | Harari et al. |
| 2018/0366485 A1 | 12/2018 | Harari |
| 2018/0366489 A1 | 12/2018 | Harari et al. |
| 2019/0006009 A1 | 1/2019 | Harari |
| 2019/0019564 A1 | 1/2019 | Li et al. |
| 2019/0028387 A1 | 1/2019 | Gray |
| 2019/0043836 A1 | 2/2019 | Fastow et al. |
| 2019/0067327 A1 | 2/2019 | Herner et al. |
| 2019/0108090 A1 | 4/2019 | Shen et al. |
| 2019/0121699 A1 | 4/2019 | Cohen et al. |
| 2019/0130946 A1 | 5/2019 | Sim et al. |
| 2019/0148286 A1 | 5/2019 | Or-Bach et al. |
| 2019/0157296 A1 | 5/2019 | Harari et al. |
| 2019/0171391 A1 | 6/2019 | Dubeyko et al. |
| 2019/0180821 A1 | 6/2019 | Harari |
| 2019/0206890 A1 | 7/2019 | Harari et al. |
| 2019/0214077 A1 | 7/2019 | Oh et al. |
| 2019/0238134 A1 | 8/2019 | Lee et al. |
| 2019/0244971 A1 | 8/2019 | Harari |
| 2019/0259769 A1 | 8/2019 | Karda et al. |
| 2019/0303042 A1 | 10/2019 | Kim et al. |
| 2019/0319044 A1 | 10/2019 | Harari |
| 2019/0325945 A1 | 10/2019 | Linus |
| 2019/0325964 A1 | 10/2019 | Harari |
| 2019/0332321 A1 | 10/2019 | Chen |
| 2019/0341091 A1 | 11/2019 | Sity et al. |
| 2019/0348424 A1 | 11/2019 | Karda et al. |
| 2019/0355747 A1 | 11/2019 | Herner et al. |
| 2019/0370005 A1 | 12/2019 | Moloney et al. |
| 2019/0370117 A1 | 12/2019 | Fruchtman et al. |
| 2019/0384884 A1 | 12/2019 | Thuries et al. |
| 2020/0006306 A1 | 1/2020 | Li |
| 2020/0051990 A1 | 2/2020 | Harari et al. |
| 2020/0098738 A1 | 3/2020 | Herner et al. |
| 2020/0098779 A1 | 3/2020 | Cernea et al. |
| 2020/0176468 A1 | 6/2020 | Herner et al. |
| 2020/0194416 A1 | 6/2020 | Or-Bach et al. |
| 2020/0201718 A1 | 6/2020 | Richter et al. |
| 2020/0227123 A1 | 7/2020 | Salahuddin et al. |
| 2020/0243486 A1 | 7/2020 | Quader et al. |
| 2020/0258897 A1 | 8/2020 | Yan et al. |
| 2020/0326889 A1 | 10/2020 | Norman et al. |
| 2020/0341838 A1 | 10/2020 | Hollis |
| 2020/0350025 A1 | 11/2020 | Purahmad et al. |
| 2020/0395328 A1 | 12/2020 | Fastow et al. |
| 2021/0247910 A1 | 8/2021 | Kim et al. |
| 2021/0248094 A1 | 8/2021 | Norman et al. |
| 2021/0265308 A1 | 8/2021 | Norman et al. |
| 2021/0374066 A1 | 12/2021 | Shah et al. |
| 2022/0004321 A1* | 1/2022 | Jiang ............. G06F 3/068 |
| 2022/0043596 A1 | 2/2022 | Madraswala et al. |
| 2022/0123003 A1 | 4/2022 | Young et al. |
| 2022/0367393 A1 | 11/2022 | Shao et al. |
| 2023/0037047 A1 | 2/2023 | Norman |

FOREIGN PATENT DOCUMENTS

| | | |
|---|---|---|
| EP | 3916784 A1 | 12/2021 |
| KR | 20120085591 A | 8/2012 |
| WO | 2018236937 A1 | 12/2018 |

OTHER PUBLICATIONS

"European Search Report, EP 16852238.1", Mar. 28, 2019.
"European Search Report, EP17844550.8", Aug. 12, 2020, 11 pages.
"Invitation to Pay Additional Fees (PCT/ISA/206), PCT/US2020/015710", Mar. 20, 2020, 2 pages.
"Notification of Reasons for Refusal, Japanese Patent Application 2018-527740", (English translation), Nov. 4, 2020, 8 pages.
"Partial European Search Report EP 16869049.3", Jul. 1, 2019, pp. 1-12.
"Partial Search Report, European Patent Application No. 20748610.1", Sep. 29, 2022, 13 pages.
"PCT Search Report and Written Opinion, PCT/US2018/038373", Sep. 10, 2018.
"PCT Search Report and Written Opinion, PCT/US2019/014319", Apr. 15, 2019.
"PCT Search Report and Written Opinion, PCT/US2019/052164", Feb. 27, 2020.
"PCT Search Report and Written Opinion, PCT/US2019/052446", Dec. 11, 2019.
"PCT Search Report and Written Opinion, PCT/US2020/015710", Jun. 9, 2020.
"PCT Search Report and Written Opinion, PCT/US2020/017494", Jul. 20, 2020, 13 pages.
"PCT Search Report and Written Opinion, PCT/US2020/065374", Mar. 15, 2021, 17 pages.
"PCT Search Report and Written Opinion, PCT/US2021/016964", Jun. 15, 2021, 19 pages.
"PCT Search Report and Written Opinion, PCT/US2022/15497", Jul. 11, 2022, 20 pages.
Hou, S. Y., et al., "Wafer-Leval Integration of an Advanced Logic-Memory System Through the Second-Generation CoWoS Technology", IEEE Transactions on Electron Devices, vol. 64, No. 10, Oct. 2017, 4071-4077.
Kim, N. , et al., "Multi-layered Vertical gate NANO Flash Overcoming Stacking Limit for Terabit Density Storage", Symposium on VLSI Tech. Dig. of Technical Papers, 2009, pp. 188-189.
Lue, H.T. , et al., "A Highly Scalable 8- Layer 3D Vertical-gate {VG} TFT NANO Flash Using Junction-Free Buried Channel BE-SONOS Device", Symposium on VLSI: Tech. Dig. of Technical Papers, 2010, pp. 131-132.
Tanaka, T. , et al., "A 768 GB 3b/cell 3D-Floaling-Gate NANO Flash Memory", Digest of Technical Papers, the 2016 EEE International Solid-Slate Circuits Conference, 2016, pp. 142-144.
Wann, H.C. , et al., "High-Endurance Ultra-Thin Tunnel Oxide in Monos Device Structure for Dynamic Memory Application", IEEE Electron Device letters, vol. 16, No. 11, Nov. 1995, pp. 491-493.
"PCT Search Report and Written Opinion, PCT/US2022/051852", Apr. 26, 2023, 15 pages.
"PCT Search Report and Written Opinion, PCT/US2022/051849", Mar. 10, 2023, 20 pages.
International Search Report and Written Opinion, PCT/US2023/070949, dated Jan. 12, 2024, 11 pages.

* cited by examiner

FIG. 10

Abort During Resume Erase

FIG. 14

MEMORY SYSTEM IMPLEMENTING WRITE ABORT OPERATION FOR REDUCED READ LATENCY

CROSS REFERENCE TO RELATED APPLICATIONS

This application claims priority to U.S. provisional patent application, Ser. No. 63/287,786, entitled "Memory System Implementing Write Abort Operation For Reduced Read Latency," filed on Dec. 9, 2021, which is incorporated herein by reference in its entirety.

The present application is also related to: (1) U.S. patent application Ser. No. 17/183,154, entitled "Channel Controller For Shared Memory Access," filed Feb. 23, 2021; (2) U.S. patent application Ser. No. 16/776,279, entitled "Device with Embedded High-Bandwidth, High-Capacity Memory using Wafer Bonding," filed on Jan. 29, 2020; (3) U.S. patent application Ser. No. 17/169,212, entitled "QUASI-VOLATILE SYSTEM-LEVEL MEMORY," filed on Feb. 5, 2021; and (4) U.S. patent application Ser. No. 17/666,255, entitled "Memory Interface With Configurable High-Speed Serial Data Lanes For High Bandwidth Memory," filed on Feb. 7, 2022, which applications are incorporated herein by reference in their entireties.

FIELD OF THE INVENTION

The present invention relates to high capacity and high bandwidth memory systems and, in particular, to memory systems implementing write abort operation to reduce read latency.

BACKGROUND OF THE INVENTION

High density memory arrays, such as 3-dimensional arrays of NOR memory strings ("3-D NOR memory arrays"), have been disclosed in, for example, U.S. Pat. No. 10,121,553 ("the '553 patent"), entitled "Capacitive-Coupled Non-Volatile Thin-film Transistor NOR Strings in Three-Dimensional Arrays," filed on Aug. 26, 2016, and issued on Nov. 6, 2018. The '553 patent disclosure is hereby incorporated by reference in its entirety for all purposes. In the '553 patent, storage or memory transistors are organized as 3-dimensional arrays of NOR memory strings formed above a planar surface of a semiconductor substrate. In addition to providing high memory density and capacity, these 3-D NOR memory arrays may be operated to provide memory circuits at highly desirable speeds that rival conventional memory circuits of much lower circuit densities and significantly higher power dissipation, e.g., such as dynamic random-access memories ("DRAMs").

Furthermore, the memory circuits in the '553 patent are sometimes referred to as "quasi-volatile memory" or "QV memory". Like those of a non-volatile memory (NVM), the memory cells of a QV memory each store a data bit as an electric charge in a charge storage material (e.g., ONO). Because of the nature of its charge-storage layer, a typical QV memory cell has a much longer data retention time than a DRAM cell and, hence, requires a lower refresh rate than the DRAM cell. For example, a typical DRAM system is designed to be refreshed every 64 milliseconds; a QV memory with a comparable effective access performance, however, may be refreshed every 10 minutes. The reduced refresh rate provides the QV memory great advantages in a lower power requirement, a reduced heat dissipation, and a higher memory availability which delivers a better host performance.

SUMMARY OF THE INVENTION

The present disclosure discloses a system and method for a high bandwidth memory interface implementing write abort operations, substantially as shown in and/or described below, for example in connection with at least one of the figures, as set forth more completely in the claims.

In one embodiment, a memory system includes a memory device including an array of storage transistors for storing data where the storage transistors are organized in multiple memory banks; and a controller device configured to interact with the memory device to perform read and write operations. The controller device issues a first command to the memory device to terminate a write operation in progress at a first memory bank of the memory device, and subsequent to terminating the write operation, the controller device issues a second command to the memory device to read data from the first memory bank of the memory device.

In another embodiment, a memory system includes a memory device including an array of storage transistors for storing data where the storage transistors are organized in multiple memory banks; and a controller device configured to interact with the memory device to perform read and write operations. The controller device is configured to issue to the memory device a write command and a write termination command, the write command causing the memory device to initiate a write operation in the memory device and the write termination command causing the memory device to terminate the memory operation.

In another embodiment, a method in a system is described in which a memory controller interacts with a memory device to perform read and write operations at the memory device and where the memory device includes storage transistors organized in multiple memory banks and each memory bank includes multiple memory pages. The method includes receiving, at the memory device, a first command and write data from the memory controller to perform a write operation at the memory device, the write command comprising at least a memory address specifying a first memory page of a first memory bank in the memory device at which the write data is to be stored; receiving, at the memory controller, a request for read data from a second memory page of the first memory bank; determining, at the memory controller, the write operation associated with the first command at the first memory bank is in progress; receiving, at the memory device, a second command from the memory controller to terminate the write operation in progress at the first memory bank of the memory device; and subsequent to terminating the write operation, receiving, at the memory device, a third command from the memory controller to read data from the second memory page of the first memory bank of the memory device.

These and other advantages, aspects and novel features of the present invention, as well as details of an illustrated embodiment thereof, will be more fully understood from the following description and drawings.

BRIEF DESCRIPTION OF THE DRAWINGS

Various embodiments of the invention are disclosed in the following detailed description and the accompanying drawings. Although the drawings depict various examples of the invention, the invention is not limited by the depicted examples. It is to be understood that, in the drawings, like reference numerals designate like structural elements. Also, it is understood that the depictions in the figures are not necessarily to scale.

FIG. 10 illustrates the write abort operation during the sensing phase of the write operation in one example.

FIG. 14 illustrates the write abort operation during a resume erase operation in one example.

DETAILED DESCRIPTION OF THE INVENTION

Figures 1A, 1B:
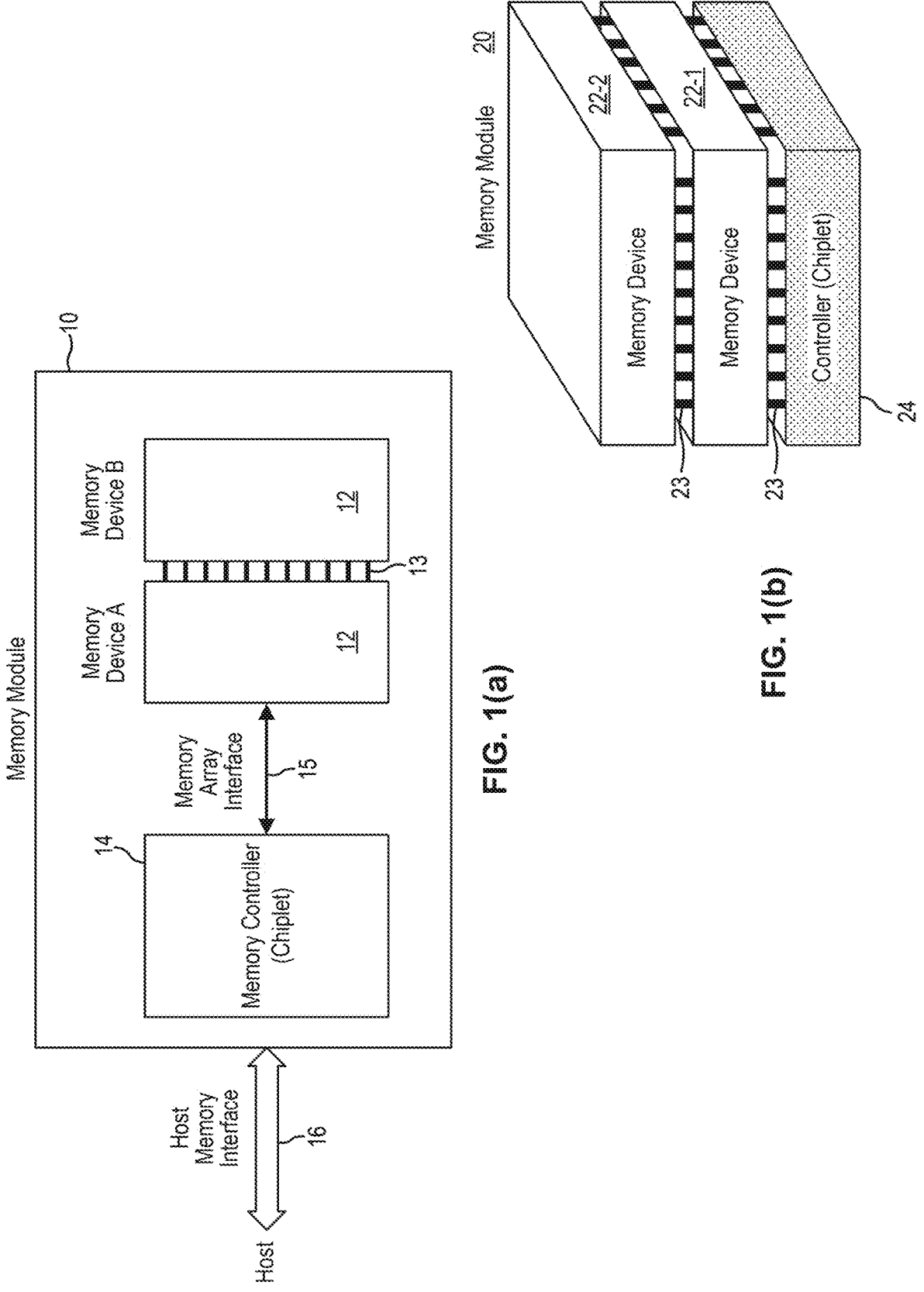
FIG. 1(a) illustrates a memory module in embodiments of the present disclosure.
FIG. 1(b) illustrates a memory module structure formed as stacked memory dies in embodiments of the present disclosure.

According to embodiments of the present invention, a memory module includes multiple semiconductor memory dies coupled to a memory controller where the semiconductor memory dies are partitioned into independently accessible memory channels with each memory channel being formed across the multiple semiconductor memory dies. That is, a memory channel is formed from a memory partition from each of the multiple semiconductor memory dies. The memory controller includes corresponding channel controllers for each memory partition to control memory operations at each memory partition independently of other partitions. As thus configured, the memory module realizes a high capacity memory with a high bandwidth access enabled by the multiple parallel and independently accessible memory channels.

According to other embodiments of the present invention, a memory system includes a memory device of storage (or memory) transistors organized in multiple memory arrays or "tiles" where the memory device interacts with a controller device to perform read and write operations. In one embodiment, each tile is an operating unit for memory access, where a memory access operating unit is referred herein as a "memory bank." In some embodiments, the controller device is configured to issue to the memory device a write command and a write termination command designated for a memory bank, where the write command directs the memory device to initiate a write operation to the designated memory bank in the memory device and the write termination command directs the memory device to terminate the memory operation at a memory bank. In some embodiments, the controller device issues a write abort command as the write termination command to terminate a write operation in progress at a certain memory bank of the memory device in order to issue a read command to the memory device to read data from the same memory bank. In some example, the read command is directed to a memory page in the memory bank different from the memory page at which the write operation was in progress. The terminated write operation can resume after the completion of the read operation.

In the present description, the terms "semiconductor memory die" or "memory die" or "semiconductor memory device" or "memory device" are used interchangeably to refer to a memory circuit of memory or storage transistors formed on a semiconductor substrate. In embodiments of the present disclosure, the semiconductor memory device includes three-dimensional arrays of storage transistors. In some embodiments, the semiconductor memory device is constructed using three-dimensional arrays of NOR memory strings formed over a semiconductor substrate, as described in the aforementioned '553 patent. In embodiments of the present disclosure, the semiconductor memory device includes a memory array of quasi-volatile storage transistors and is sometimes referred to as a "quasi-volatile memory" ("QV memory"). Quasi-volatile storage transistors have retention time much longer than typical DRAM memory cells so that a quasi-volatile memory device may be refreshed much less frequently than the typical DRAM memory device. For example, a DRAM memory device needs to refresh the DRAM memory cells every 64 milli-seconds while a quasi-volatile memory device may refresh the quasi-volatile storage transistors at an interval of 10 minutes or more. In the present description, a NOR-type memory string includes storage transistors formed above a planar surface of a semiconductor substrate that share a common source region and a common drain region, where each storage transistor can be individually addressed and accessed. In some examples, a three-dimensional array can be formed with the NOR memory strings provided on multiple planes (e.g., 8 or 16 planes) above the semiconductor substrate, with the NOR memory strings on each plane arranged in rows. In the present description, the term "memory device" is also sometimes referred to a single memory die or a set of multiple memory dies coupled to a memory controller.

In the present description, the term "storage transistor" is used interchangeably with "memory transistor" to refer to the data storage structure formed in the memory die described herein. In some examples, the semiconductor memory device of the present disclosure including NOR memory strings of randomly accessible storage transistors (or memory transistors) can have applications in computing systems as the main memory where the data storage locations are directly accessible by the processors of the computer systems, for instance, in a role served in the prior art by conventional random-access memories (RAMs), such as dynamic RAMs (DRAMS) and static RAMs (SRAMs). For example, the memory structure of the present disclosure can be applied in computing systems to function as a random-access memory to support the operations of microprocessors, graphical processors and artificial intelligence processors. In other examples, the memory structure of the present disclosure is also applicable to form a storage system, such as a solid-state drive or replacing a hard drive, for providing long term data storage in computing systems.

In some embodiments, the semiconductor memory device is formed using thin-film storage transistors implementing charge trapping as the data storage mechanism where data is stored in a charge storage film in each storage transistor. For examples, the charge storage film includes a tunneling dielectric layer, a charge trapping layer and a blocking layer, which can be implemented as a multilayer including silicon oxide, silicon nitride, and silicon oxide, arranged in this order and referred to as an ONO layer. An applied electrical field across the charge storage film adds or removes charge from charge traps in a charge trapping layer of the charge storage film, altering the threshold voltage of the storage transistor to encode a given logical state to the storage transistor.

In other embodiments, the semiconductor memory device is formed using ferroelectric field-effect transistors as the storage transistors. More specifically, a ferroelectric field-effect transistor (referred herein as ferroelectric transistors or FeFETs) is formed by using a ferroelectric material as the gate dielectric layer between the gate conductor and the channel of a field-effect transistor. The ferroelectric transistor realizes memory function by storing data as polarization states in the ferroelectric gate dielectric layer (also referred to as the "ferroelectric dielectric layer"). In particular, a voltage applied to the gate conductor induces electrical polarization in the ferroelectric dielectric layer, which polarization can be reversed with application of a voltage in the opposite polarity. The induced polarization states of the ferroelectric dielectric layer change the threshold voltage of the ferroelectric transistor. The change or shift in the threshold voltage of the ferroelectric transistor due to the different polarization states can be used to represent data in different logical states. For example, two logical states (e.g., "0" and "1") can be represented by the higher and lower threshold voltages of the ferroelectric transistor as a result of two induced electrical polarization states in the ferroelectric dielectric layer. Three-dimensional arrays of NOR memory strings of thin-film ferroelectric transistors have been disclosed in, for example, U.S. patent application Ser. No. 17/812,375, entitled "3-Dimensional Memory String Array Of Thin-Film Ferroelectric Transistors," of Christopher J. Petti et al., filed on Jul. 13, 2022, which application is incorporated herein by reference in its entirety.

In some embodiments, the ferroelectric dielectric layer is a doped hafnium oxide layer. In some examples, the doped hafnium oxide layer may include one or more of: zirconium-doped hafnium oxide (HZO), silicon-doped hafnium oxide (HSO), aluminum zirconium-doped Hafnium oxide (HfZrAlO), aluminum-doped hafnium oxide ($HfO_2$:Al), lanthanum-doped hafnium oxide ($HfO_2$:La), hafnium zirconium oxynitride (HfZrON), hafnium zirconium aluminum oxide (HfZrAlO) and any hafnium oxide that includes zirconium impurities.

In yet other embodiments, the 3-dimensional array of NOR memory strings is formed using junctionless ferroelectric storage transistors. That is, the ferroelectric storage transistors do not include p/n junction as the drain or source region in the channel. Instead, the drain and source regions are formed by conductive layers, such as a metal layer, and the semiconductor channel region is formed of an amorphous oxide semiconductor material, such as indium gallium zinc oxide (IGZO). In some examples, the source/drain conductive layers can be formed from a metal layer or a low resistivity metallic conductive material, such as molybdenum (Mo), tungsten (W), tungsten nitride (WN), ruthenium or titanium tungsten alloy (TiW). In some examples, the semiconductor channel region may be formed from other oxide semiconductor materials, such as indium zinc oxide (IZO), indium tungsten oxide (IWO), or indium tin oxide (ITO). Three-dimensional arrays of NOR memory strings of thin-film junctionless ferroelectric transistors have been disclosed in, for example, U.S. patent application Ser. No. 17/936,320, entitled "Memory Structure Including Three-Dimensional NOR Memory Strings Of Junctionless Ferroelectric Memory Transistors And Method Of Fabrication," of Eli Harari, filed on Sep. 28, 2022, which application is incorporated herein by reference in its entirety.

FIG. 1(a) illustrates a memory module in embodiments of the present disclosure. Referring to FIG. 1(a), a memory module 10 is built in a multi-die manner with one or more semiconductor memory dies 12 each with memory arrays formed thereon and a memory controller die 14 ("memory controller") with control circuitry formed thereon. In the example shown in FIG. 1(a), the memory module 10 includes two semiconductor memory dies 12—memory die A and memory die B—that are connected by interconnect structures 13, such as through-silicon vias (TSV). The memory dies 12 communicate with the memory controller 14 through a memory array interface 15. In some embodiments, the memory array interface 15 is a high-bandwidth data interface implemented on interconnect structures that connect the memory dies 12 to the controller die 14, such as TSV or hybrid bonds. The memory controller 14 also includes one or more external interfaces, such as memory interfaces for host access and other system functions. For example, the memory controller 14 includes a host interface 16 for communicating with a host processor, such as to receive requests from the host to read data from or write data to the memory module 10 and to transmit responses to the host, such as write completion response or the read data.

In the present description, a "memory module" refers to one or more semiconductor memory dies coupled to an associated memory controller die to form a high density and high capacity memory system. Each semiconductor memory die (also referred to as "memory die" or "memory device") includes multiple three-dimensional arrays of storage transistors, also referred to as memory transistors or memory cells, for storing memory data. In the present description, the memory controller die is sometimes referred to as "a memory controller," "a controller die," "a controller device," or "a chiplet," and includes control circuit for accessing and operating the memory devices and performing other memory control functions, such as data routing and error correction. The control circuit may also include one or more external interfaces, such as a memory interface for host access. In the present embodiment, the memory module is built as a multi-die structure with the memory device formed on one semiconductor die and the memory controller formed on a separate semiconductor die. The memory die and the memory controller die may be integrated using a variety of integration techniques, such as using TSVs, hybrid bonds, exposed contacts, interposers, printed circuit boards and other suitable interconnect techniques, especially techniques for high density interconnects.

As thus configured, the memory module 10 of the present disclosure integrates one or more semiconductor memory dies with one memory controller die to realize a high capacity memory system with faster memory controller operations and faster memory performance. In addition, the memory dies and the controller die can be separately fabricated using specialized manufacturing processes to optimize the performance of each integrated circuit. More specifically, the memory module 10 can be built using a fabrication process that is optimized for memory circuits and a fabrication process that is optimized for the memory controller. For example, the memory controller may be fabricated using a manufacturing process that is optimized for forming low-voltage and fast logic circuits. In this manner, the performance of the memory circuit and the performance of the memory controller can be individually optimized to realize a memory module 10 with high capacity, high bandwidth and faster memory operations.

In one embodiment, the memory controller is formed as a discrete semiconductor die or integrated circuit customized for use as a memory controller, for example, as an application-specific integrated circuit. In another embodiment of the present invention, the memory controller may be implemented in a general purpose integrated circuit (e.g. a central processing unit (CPU), a graphic processing unit (GPU), a communication chip, or a field programmable gate array). The functional blocks forming the memory controller are embedded in the general purpose integrated circuit and the memory array interface of the memory controller are electrically and physically connected to the memory device, using one of the techniques described above. As thus configured, the embedded memory controller does not include a host interface circuit but can communicate directly with the logic circuits through interconnect lines formed in or on the general purpose integrated circuit. Such a configuration is sometimes referred to as "in memory compute." In memory compute is particularly desirable in artificial intelligence and machine learning applications that are data intensive, and which require a great deal of memory in close proximity to the CPU or GPU core processor, which is embedded with the memory controller functional blocks.

FIG. 1(b) illustrates a memory module structure formed as stacked memory dies in embodiments of the present disclosure. For example, the memory module 10 of FIG. 1(a) may be formed by stacking two or more memory dies and integrating the stacked memory dies with a memory controller die, as shown in FIG. 1(b). Referring to FIG. 1(b), a memory module 20 includes multiple memory devices 22 formed stacked one upon another. For example, the memory module 20 includes a memory device 22-1 and a memory device 22-2 formed stacked one on top of another. The stacked memory devices 22 (or "memory stack") is then integrated with a controller die 24. In some embodiment, the memory stack is interconnected to the controller die 24 through through-silicon vias 23 ("TSV") formed in and through the memory devices 22 and connecting to contact pads on the controller die 24. In other embodiments, other methods to interconnect the stacked memory devices 22 to the controller die 24 may be used, such as hybrid bonds or copper studs, interposers or other suitable interconnect methods. By integrating multiple memory dies in the stack, a memory module 20 can realize a high capacity memory circuit within a small footprint. The resulting advantage is especially significant when multiple memory dies are stacked to provide high memory capacity, while sharing a memory controller among the multiple memory dies to achieve a reduced cost-per-unit.

Memory Channel Configuration

Figures 2A, 2B:
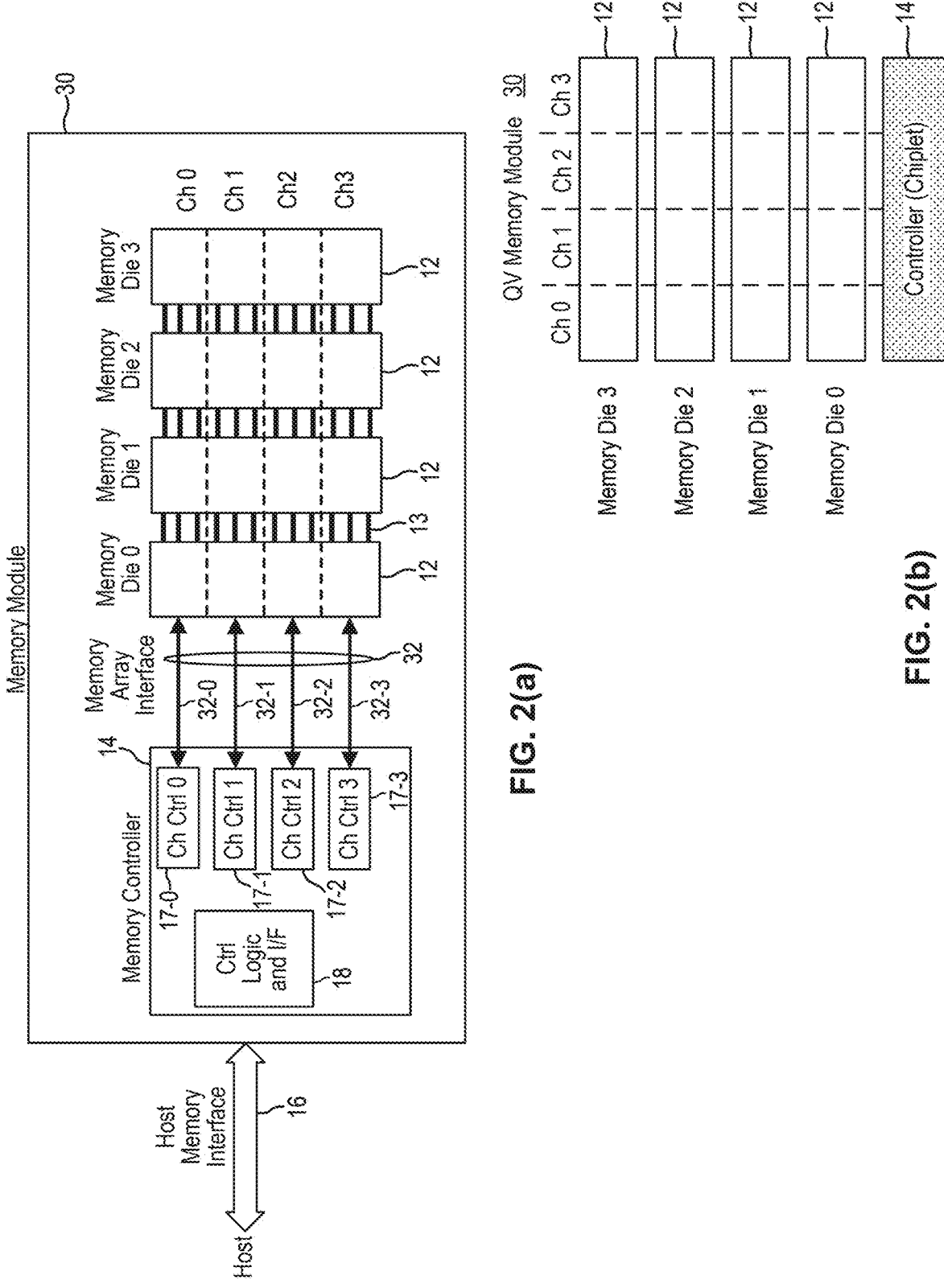
FIG. 2(a) illustrates a memory module configured with independently accessible memory channels in embodiments of the present disclosure.
FIG. 2(b) illustrates the memory module 30 in a stacked memory die configuration in some embodiments.

FIG. 2(a) illustrates a memory module configured with independently accessible memory channels in embodiments of the present disclosure. Like elements in FIGS. 1(a) and 2(a) are given like reference numerals to simplify the discussion. Referring to FIG. 2(a), a memory module 30 includes multiple semiconductor memory dies 12 that are connected together through interconnect structures 13, such as TSV. In the present example, four memory dies 12 are included, labeled as Memory Die 0 to Memory Die 3. The memory dies 12 communicates with the memory controller 14 through a memory array interface 32. The memory controller 14 includes one or more external interfaces, such as a memory interface 16 for communicating with a host or host processor.

In embodiments of the present disclosure, each memory die 12 is partitioned into N number of partitions and corresponding partitions across all of the memory dies 12 are grouped to form N independently accessible memory channels, N being an integer great than 1. In the present embodiment, four memory channels are provided, illustrated as memory channels Ch 0 to Ch 3. In other embodiments, the memory module may be partitioned into a suitable number of memory channels based on factors such as bandwidth and/or reliability or quality of service requirements. As thus configured, each memory channel operates independently of each other to provide memory functions using the storage transistors within the channel partitions. The memory controller 14 operates each memory channel independently and in parallel of the other channels to perform memory operations, such as read or write operations. The memory array interface 32 provides individual memory channel interface for each memory channel. That is, the memory channels Ch 0 to Ch 3 are independently accessible over respective memory channel interfaces 32-0 to 32-3. In embodiments of the present invention, the memory controller 14 includes channel controllers 0-3, denoted as 17-0 to 17-3, to access respective memory channels Ch n over the respective memory array interface 32-n. The memory controller 14 includes logic circuitry 18 which includes the control circuits for controlling the channel controllers 17-n, the host interface circuit for communicating with the host over the memory interface 16, and other circuitry for controlling the memory operation. The memory controller 14 directs incoming read or write requests received from the host to respective channel controllers 17-n to store memory data into or retrieve memory data out of the corresponding memory channels. By partitioning and operating the memory dies 12 as individually accessible memory channels, the memory module 30 is capable of providing high bandwidth data transfer for the host.

A salient feature of the memory channel configuration in memory module 30 is that each memory channel is formed across the multiple semiconductor memory dies 12 and each memory channel is individually controlled by respective channel controller in the memory controller 14. That is, memory channel Ch 0 is formed from partitions in memory die 0 to memory die 3. Similarly, memory channels Ch1 to Ch3 are each formed from partitions in memory dies 0 to memory die 3. The memory channel configuration of the present invention is particularly advantageous when applied in a memory module with a stacked memory die configuration. FIG. 2(b) illustrates the memory module 30 in a stacked memory die configuration in some embodiments. In the stack memory die configuration, the memory dies 0-3 are stacked one on top of another and the memory stack is then further formed stacked on the memory controller 14, with interconnect structures connecting the stacked memory dies 0-3 to the memory controller 14. In embodiments of the present invention, each memory die 12 is partitioned into N number of memory partitions. The corresponding memory partitions across the multiple stacked memory dies 12 form a memory channel. In other words, each memory channel Ch n includes memory partitions from memory die 0 to memory die 3. In the illustration shown in FIG. 2(b), a memory channel Ch n can be seen as being formed vertically across the stacked memory dies. The N number of memory channels are formed in parallel with each other across the stacked memory dies. With each memory channel being provided with its own channel controller, each memory channel can be individually controlled and accessed in parallel to receive incoming memory data and to provide memory output data.

The memory channel configuration of the present invention implemented in memory module 30 has several advantages. First, the memory channel configuration can be adapted to any number of memory dies 12 used to form the memory module. For N number of memory channels, the memory controller 14 can be easily modified to address any number of memory dies included in the memory stack merely by configuring the memory address bits designated for selecting a memory die from the memory channel. Accordingly, the memory channel configuration of the present invention enables a scalable design for the memory module. Second, the memory channel configuration enables the memory controller to take advantage of parallelism in memory access, resulting in more efficient utilization of the storage transistors on each memory die. In operation, the memory controller 14 distributes the memory access among the N memory channels which minimizes access conflicts and increases utilization of the large number of storage transistors formed on each memory die 12. The memory channel configuration of the present invention enable a large number of storage transistors to be accessed concurrently and in parallel over the N number of channels, realizing high bandwidth memory access.

Figure 3:
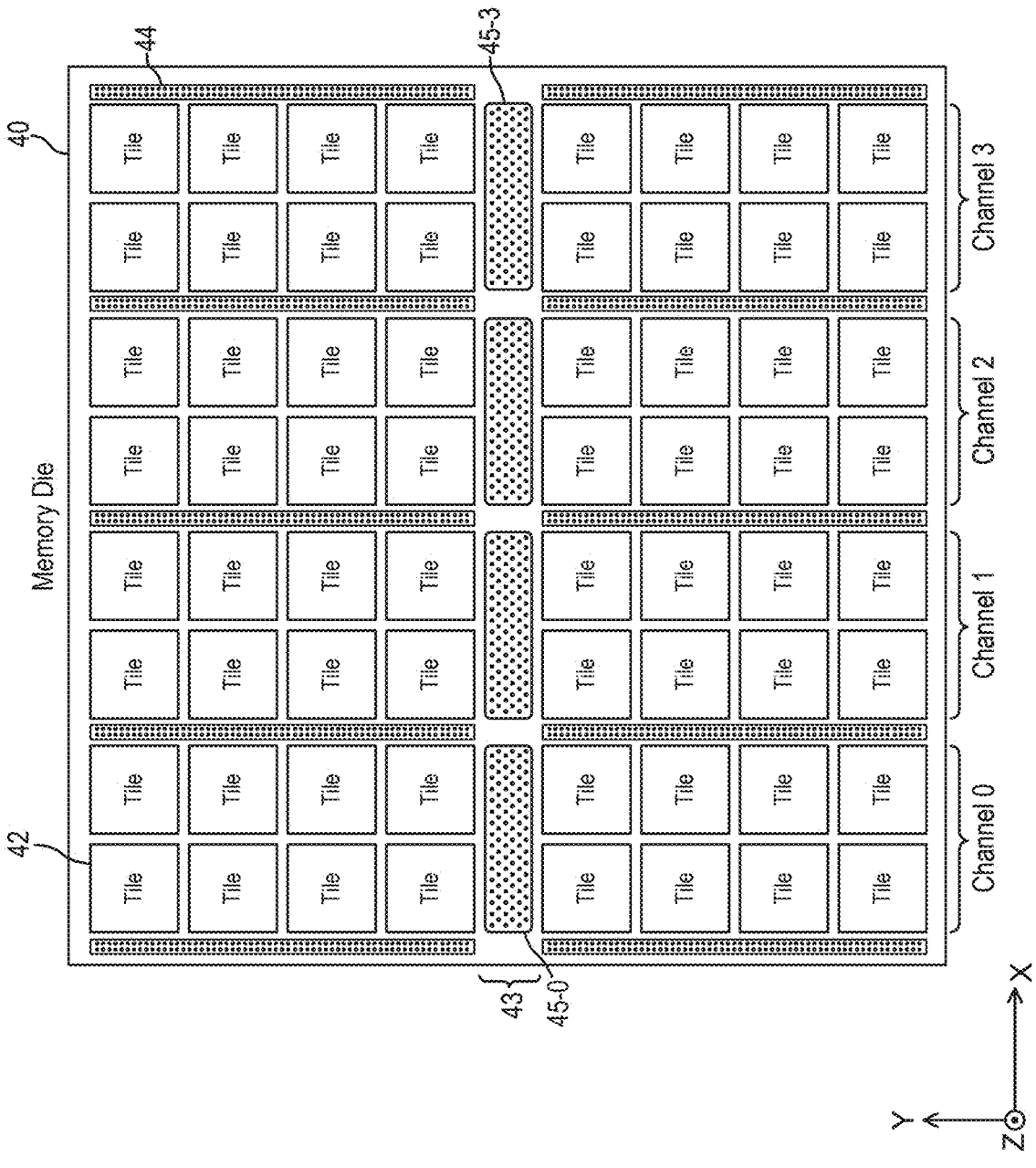
FIG. 3 is a top view of a semiconductor memory die illustrating the organization of storage transistors in embodiments of the present disclosure.

FIG. 3 is a top view of a semiconductor memory die illustrating the organization of storage transistors in embodiments of the present disclosure. Referring to FIG. 3, a semiconductor memory die (or memory device) 40 includes multiple three-dimensional arrays ("memory arrays") of thin-film storage transistors where the memory arrays are organized as a 2-dimensional array of "tiles" 42 (i.e., the tiles are arranged in rows and columns) formed above a planar semiconductor substrate. Each tile 42 includes a three-dimensional array of thin-film storage transistors. In the present description, a tile 42 in the memory die 40 refers to a physically isolated array of memory cells with a localized modular control circuit where the tile can be operated concurrently with other tiles and each tile provides an access unit of memory data, for example, a page of memory data. Accordingly, a tile 42 in the memory die 40 refers to a regular array of addressable modular structure of memory cells placed in a regular manner. In some embodiments, each tile 42 includes a memory array of quasi-volatile storage transistors that are organized as 3-dimensional arrays of NOR memory strings. In the present description, the memory arrays in the memory die 40 are sometimes referred to as quasi-volatile memory circuits.

In memory die 40, each tile 42 can be configured to be individually and independently addressed. In embodiments of the present invention, each tile 42 is used as an operating unit for memory access, which is referred to as a "memory bank" or a "bank." Accordingly, a memory bank consists of one tile as the memory access operating unit and each memory bank operates on one access unit of memory data (e.g. a page of memory data or a "memory page"). That is, each memory access from the host is based on an access unit of memory data, where the access unit is referred to as a page of memory data or a memory page. In other words, each memory bank includes one tile where the single tile alone provides the access unit of memory data or the entire memory page of memory data. For example, each memory page may include 512 bits of memory data. This is in contrast to conventional memory devices where a memory die includes multiple memory banks with each memory banks providing only a portion of the access unit of memory data and the entire access unit of memory data has to be obtained by combining memory data from multiple memory banks.

More specifically, in some embodiments, each tile is organized into multiple memory pages of storage transistors, each memory page including a subset of storage transistors in the tile. For example, a memory page may include 512 storage transistors and a tile may include over 120K memory pages of storage transistors. As thus organized, the storage transistors in the memory device are accessed in units of a memory page having a given byte size, that is, each read or write operations to the memory device are performed in units of a memory page. In one example, the memory device may be accessed in a memory page size of 64 byte or 512 bits.

In the embodiments described herein, a memory bank is described as consisting of one tile. In other embodiments, one or more tiles may be configured to form a memory access operating unit or a memory bank. For example, a row of tiles or a 2-dimensional block of tiles may be configured to be addressed together as a memory bank. In other words, in alternate embodiments, a memory bank may include a single tile 42 or a block of tiles, such as a row or a section of tiles. As thus configured, the tile 42 is a building block that allows flexibility in configuring the memory module to adapt to application requirements.

In the present description, a "tile" refers to a physically isolated memory array of memory cells with a localized modular control circuit while a "memory bank" refers to an operating unit or a logical unit of memory access. In the present description, a memory bank includes one tile and the term "memory bank" or "bank" is sometimes used interchangeably with the term "tile" to refer to the memory access operating unit consisting of a single tile or single physically isolated memory array. It is instructive to note that, in general, a "tile" refers to the physical memory array while a "memory bank" refers to the logical memory access operating unit.

On the memory die 40, support circuitry for operating the thin-film storage transistors of each tile are formed locally on or in the semiconductor substrate under the memory array. In some embodiments, the support circuitry for each tile are localized and are provided for modularity in the portion of the semiconductor substrate underneath each respective memory array. The tile-based support circuits, also referred to as modular control circuits or "circuit under array" ("CuA"), may include various voltage sources for power supply, ground, programming, erase or read voltages, sense amplifiers, various data latches and registers, various logic circuits, various analog circuits, and other circuits used in memory operations. Example logic circuits include timing control, address decoders, redundancy logic and control circuits. Example analog circuits include data driver, word line and bit line drivers and select transistors, and bias control transistors. Furthermore, in embodiments of the present disclosure, each CuA includes a state machine or a sequencer to execute instructions to be carried out at the associated tile. With each CuA incorporating a sequencer which functions as a local processor for the CuA, the CuA forms an intelligent control circuit to enable each tile to be operated in an independent and self-contained manner and to enable multiple tiles to be operated concurrently and independently.

In operation, the sequencer in each CuA associated with each tile receives commands from the controller circuit directed to the associated tile and decodes the commands to execute memory operations at the associated tile. For example, the sequencer performs read and write operations at the associate tile in response to commands received from the controller device, with the sequencer issuing instructions to execute the entire read operation sequence or write operation sequence at the memory page in the tile designated by the memory address associated with the memory operation. Importantly, on the memory die 40, the complete circuitry of the localized modular control circuit (CuA) is replicated for each tile so that each tile can be operated independently to perform memory operations in response to commands from the controller device addressed to the particular tile.

In embodiments of the present invention, the tile-based support circuits are formed in the semiconductor substrate using a first fabrication process and then the semiconductor substrate with the tile-based support circuits formed thereon is provided in a second fabrication process to form the thin-film storage transistors.

As thus configured, each tile 42 in the memory die 40 operates as a semi-autonomous mini-array of memory cells within the memory die 40. With the support circuitry of the intelligent CuA, each tile 42 can be operated semi-autonomously and independently of other tiles in the memory die 40. The tiles 42, each with its own associated CuA, enable concurrent memory access to a large number of storage transistors in memory die 40 to increase memory throughput and reduce latency. In some embodiments, two neighboring tiles may share certain support circuitry in the CuA. For example, a tile may include a set of sense amplifiers which is shared with a neighboring tile. Each tile, when selected for access, uses its own set of sense amplifiers and the set of sense amplifiers in the neighboring tile. In this case, the neighboring tile, for which the set of sense amplifiers has been borrowed for use, may be marked as non-accessible until the operation on the borrowed sense amplifiers is complete.

In the embodiment shown in FIG. 3, the memory die 40 is illustrated as including tiles arranged in 8 rows and 8 columns. The embodiment shown in FIG. 3 is illustrative only and not intended to be limiting. In one example, a memory die may include 1024 tiles arranged in 32 rows and 32 columns or 2048 tiles arranged in 64 rows of 32 columns. The number of tiles and the arrangement of tiles in the memory die 40 can be selected based on various design factors, such as the size and dimension of the memory die or the placement of interconnect structures.

In embodiments of the present disclosure, the memory die 40 is divided into multiple partitions to form separate memory channels by dividing the two-dimensional array of tiles. In the present embodiment, the memory die 40 is divided by the tile columns into four partitions, forming four memory channels Ch 0 to Ch 3. In the present example, each memory channel (Ch 0 to Ch 3) includes two columns of 8 tiles, for a total of 16 tiles per memory channel. In another example, in a memory die with 1024 tiles, the memory die may be divided by tile columns into 8 partitions, forming eight memory channels, with each memory channel including four columns of 32 tiles, for a total of 128 tiles per memory channel.

In embodiments of the present disclosure, the memory die 40 includes a data interface area 43 for forming the interconnect structures 45 for connection to the memory controller. In the present embodiment, the data interface area is provided in the middle of the memory die, positioned between the two halves of the tile columns. Furthermore, to support the memory channel configuration, the interconnect structures 45 are partitioned according to the channel configuration to provide interconnect structures 45-0 to 45-3 for each memory channel Ch 0 to Ch 3. For example, the interconnect structures 45 are TSVs and each memory channel is provided with a dedicated set of interconnect structures or TSVs for transferring data for that memory channel to and from the memory controller, or more particularly, to the associated channel controller in the memory controller. As shown in FIG. 3, the memory die 40 may include additional sets of interconnect structures 44 for supplying the power and ground connections to the memory arrays formed in the tiles 42. In some embodiments, multiple memory dies 40 are used to form a memory stack, which is then stacked on the memory controller to form a memory module, as shown in FIG. 2(b). In a memory stack, a memory channel is formed by the tiles in the same channel partition across all of the memory dies in the memory stack.

Figure 4A:
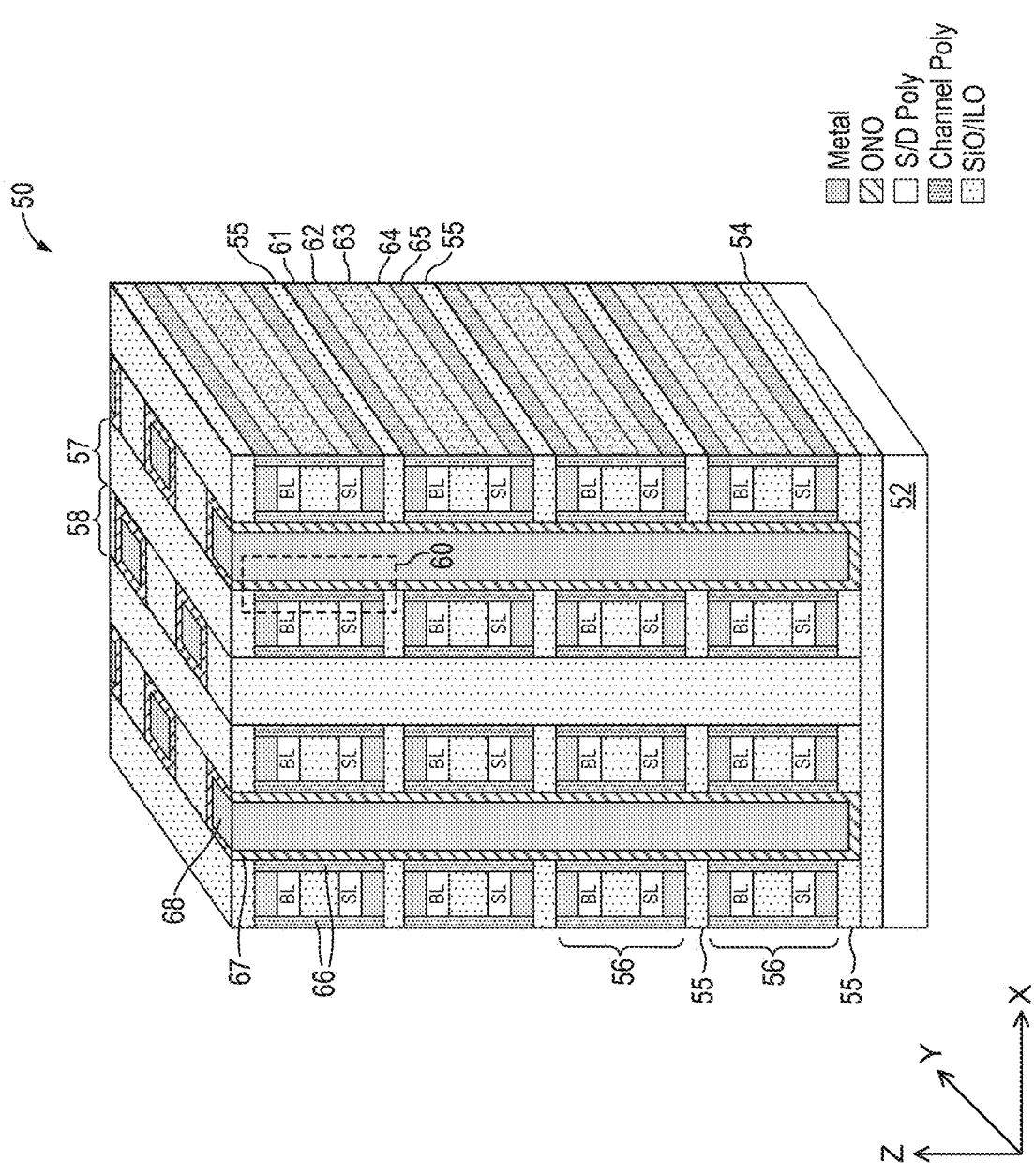
FIG. 4(a) illustrates a memory structure including a three-dimensional array of NOR memory string in some examples.

FIG. 4(a) illustrates a memory structure including a three-dimensional array of NOR memory string in some examples. In embodiments of the present disclosure, the memory structure of FIG. 4(a) is used to form the three-dimensional array of storage transistors in a tile of the memory die 40 in FIG. 3. Various methods for forming 3D NOR memory strings are described in the aforementioned '553 patent. Referring to FIG. 4(a), a memory structure 50 includes thin-film storage transistors 60 formed as NOR memory strings along a horizontal direction (the Y-direction) in multiple planes, each plane being formed by a set of active layers 56. In particular, the memory structure 50 includes a number of active layers 56 formed on a planar surface of a semiconductor substrate 52. A buffer oxide layer 54 may be provided between the semiconductor substrate 52 and the active layers 56. The active layers 56 are formed one on top of another in the Z-direction (i.e., along a direction normal to the planar surface of the substrate 52) and separated from each other by an isolation dielectric layer 55, such as a silicon oxide carbide (SiOC) layer. The active layers 56 are divided in the X-direction into narrow strips ("active strips") 57 that are stacked one on top of another to form stacks of active strips ("active stacks") extending in the Y-direction.

Each active layer 56 includes first and second doped semiconductor layers 62, 64 (e.g., $n^+$ polysilicon or heavily doped n-type polysilicon) separated by a dielectric layer 63 (e.g., silicon oxide). The first and second doped semiconductor layers 62, 64 form the drain and source regions of the storage transistor 60. Each active layer 56 may include one or more conductive layers 61, 65 (e.g., titanium nitride (TiN)-lined tungsten (W)). Each conductive layer 61 or 65 is formed adjacent one of the doped semiconductor layers 62, 64 to reduce the resistivity of the doped semiconductor layer it contacts. During intermediate processing steps, the active layer may include sacrificial layers (e.g., silicon nitride or carbon) to be subsequently replaced by final conductive layers. Subsequent processing steps form the channel regions 66 (e.g., p⁻ polysilicon or lightly doped p-type polysilicon), the charge storage films 67, and the gate conductors or gate electrodes 68 (e.g., TiN-lined W) in narrow trenches between the separated active stacks. The gate electrodes 68 and the charge storage films 67 are formed as columnar structures extending in the Z-direction. In the present example, the charge storage film 67 encircles the gate electrode 68 in the columnar structure. In the present description, the gate electrodes 68 are also referred to as "local word lines" and a gate electrode 68 encircled by a charge storage film 67 is collectively referred to as a local word line (LWL) structure 58.

In the embodiment illustrated in FIG. 4(*a*), the storage transistors in the three-dimensional memory array are charge-trapping type storage transistors and the charge storage films 67 include a tunneling dielectric layer, a charge trapping layer and a blocking layer. The tunneling dielectric layer may be any silicon oxide (SiOx), silicon nitride (SixNy), silicon oxide nitride (SiON), any aluminum oxide (AlOx), any hafnium oxide (HfOx), zirconium oxide (ZrOx), any hafnium silicon oxide (HfSixOy), any hafnium zirconium oxide (HfZrO), or any combination thereof. The charge trapping layer may be a multilayer and may include any silicon nitride (SixNy), hafnium oxide (HfO₂), or hafnium silicon oxynitride (HfSiON). The blocking layer may be any silicon oxide (SiOx), aluminum oxide, or both. In one example, the charge storage films 67 is referred to as an ONOA file and includes a silicon oxide layer (SiOx), a silicon nitride layer (SiN), a silicon oxide layer (SiOx), and an aluminum oxide layer (Al₂O₃) that are stacked in this order from the channel layer side toward the gate conductor layer.

The first and second doped semiconductor layers of each active strip form a source region 64 ("common source line") and a drain region 62 ("common bit line") of the storage transistors which may be formed along one or both sides of the active strip 57. In particular, the storage transistor 60 is formed at the intersection of an active strip 57 with the channel region 66 and an LWL structure 58. In the present illustration, the LWL structures 58 are formed staggered in adjacent trenches bordering an active strip 57 so that storage transistors formed on both sides of an active strip are offset from each other in the Y-direction along the memory string. In the case the storage transistor is a ferroelectric storage transistor, the first and second doped semiconductor layers are omitted and the conductive layers 61, 65 act as the source and drain terminals, as will be explained in more detail below.

As thus constructed, the storage transistor 60 is formed by the first doped semiconductor layer 62 forming the drain region (the common bit line), the second doped semiconductor layer 64 forming the source region (the common source line), the channel region 66 in contact with both the drain region 62 and the source region 64, the gate electrode 68 and the portion of the charge storage film 67 that is situated between the gate electrode 68 and the channel region 66. Each storage transistor 60 is isolated from adjacent storage transistors along an active stack (in the Z-direction) by the isolation dielectric layer 55. As thus configured, along each active strip (in the Y-direction), the storage transistors that share the common source line and the common bit line form a NOR memory string (referred herein as a "Horizontal NOR memory string" or "HNOR memory string").

In alternate embodiments, the storage transistors in the three-dimensional memory array are junctionless ferroelectric storage transistors. In some embodiments, a ferroelectric storage transistor is constructed in a similar manner as the charge-trapping type storage transistors by replacing the charge storage films with a ferroelectric gate dielectric layer incorporating a ferroelectric material. FIG. 4(*b*) illustrates a memory structure including a three-dimensional array of NOR memory string in some examples. More specifically, FIG. 4(*b*) illustrates an exemplary three-dimensional memory array of junctionless ferroelectric storage transistors. Like elements in FIGS. 4(*a*) and 4(*b*) are given like reference numerals and discussion may be omitted. Referring to FIG. 4(*b*), a memory structure 50B includes thin-film junctionless ferroelectric storage transistors 60B formed as NOR memory strings along a horizontal direction (the Y-direction) in multiple planes, each plane being formed by a set of active layers 56. Each active layer 56 includes first and second conductive layers 61, 63 (e.g., titanium nitride (TiN)-lined tungsten (W)) separated by a dielectric layer 63 (e.g., silicon oxide). The first and second conductive layers 61, 65 for the drain and source terminals of the ferroelectric storage transistors. Subsequent processing steps form the channel regions 66B (e.g., an oxide semiconductor material, such as IGZO), the ferroelectric dielectric layer 67B, and the gate conductors or gate electrodes 68 (e.g., TiN-lined W) in narrow trenches between the separated active stacks. The gate electrodes 68 and the ferroelectric dielectric layer 67B are formed as columnar structures extending in the Z-direction. In the present description, the gate electrodes 68 are also referred to as "local word lines" and a gate electrode 68 enclosed by the ferroelectric dielectric layer 67B is collectively referred to as a local word line structure 58.

In the embodiment illustrated in FIG. 4(*b*), the storage transistors in the three-dimensional memory array are junctionless ferroelectric storage transistors. In some embodiments, the ferroelectric gate dielectric layer 67B is a doped hafnium oxide (HfO₂) layer. In one example, the hafnium oxide is doped with zirconium oxide (ZrO₂) to form a hafnium zirconium oxide layer (HZO). In another example, the hafnium oxide is doped with silicon (Si), iridium (Ir) and lanthanum (La). In some embodiments, the gate dielectric layer may further include an interfacial layer, such as a material with a high permittivity, between the channel region and the gate dielectric layer.

The first and second conductive layers of each active strip form a source line ("common source line") and a drain line ("common bit line") of the storage transistors which may be formed along one or both sides of the active strip 57. In the example shown in FIG. 4(*b*), storage transistors are only formed on one side of the active strip 57, with the other side of the active strip bordering an auxiliary trench 59. The auxiliary trench 59 does not include any active transistor devices. The ferroelectric storage transistor 60B is formed at the intersection of an active strip 57 with the channel region 66B and an LWL structure 58. As thus configured, along each active strip (in the Y-direction), the storage transistors that share the common source line and the common bit line form a NOR memory string or HNOR memory string. In some examples, three-dimensional arrays of NOR memory strings of thin-film junctionless ferroelectric transistors have been disclosed in U.S. patent application Ser. No. 17/936, 320, entitled "Memory Structure Including Three-Dimensional NOR Memory Strings of Junctionless Ferroelectric Memory Transistors and Method of Fabrication," of Eli Harari, filed on Sep. 28, 2022, which application is incorporated herein by reference in its entirety. The memory structure 50B of FIG. 4(b) can be constructed based on the memory structures described in the '320 patent application.

Figure 4B:
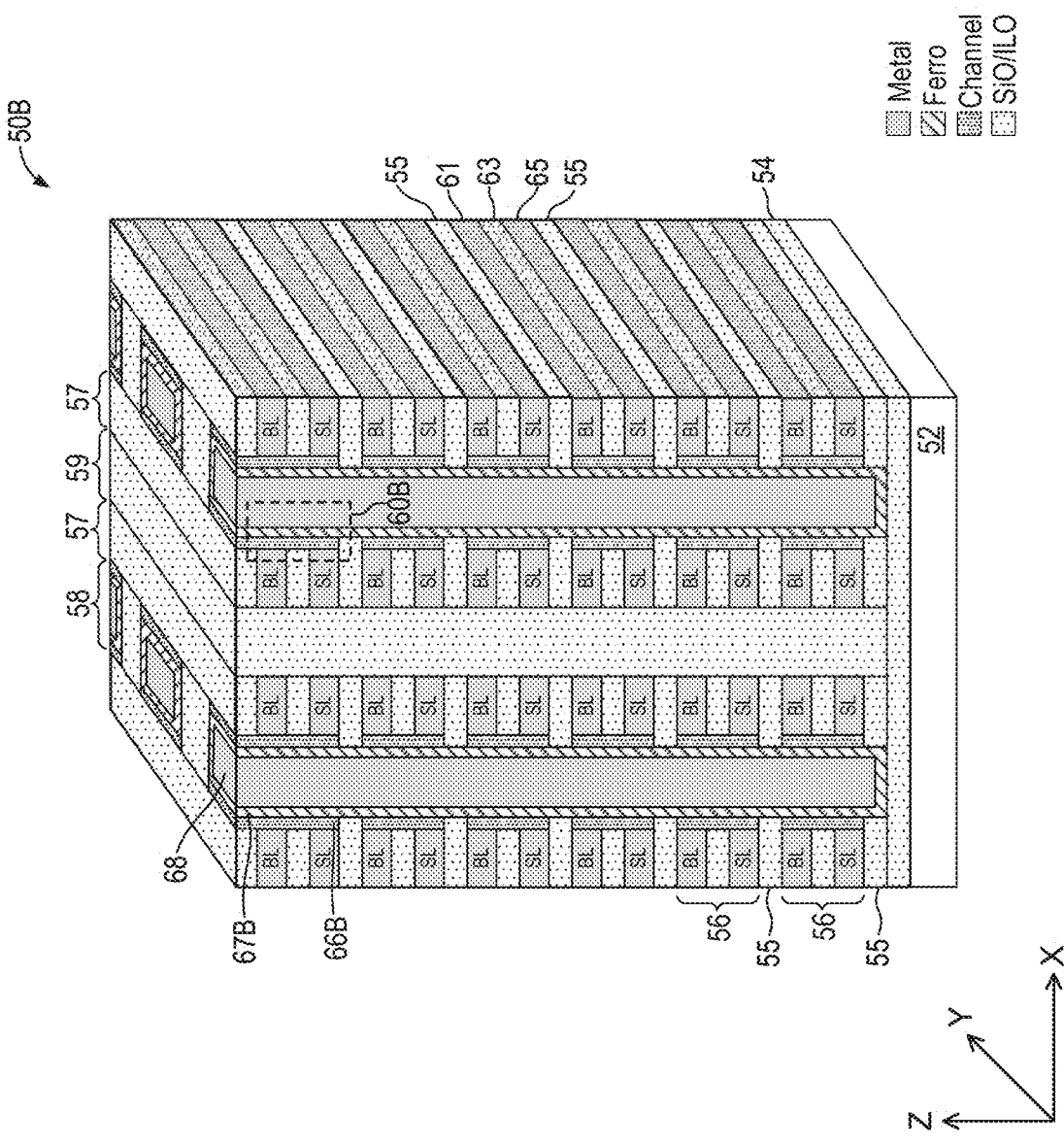
FIG. 4(b) illustrates a memory structure including a three-dimensional array of NOR memory string in some examples.

Referring to both FIGS. 4(a) and 4(b), to complete the memory circuit, various types of circuits are formed in or at the surface of the semiconductor substrate 52 to support the operations of the NOR memory strings. As described above, the support circuits for storage transistors in a tile are formed localized under the respective tile and are referred to as "circuit under array" or CuA. The circuits in the CuA may include power supplies, sense amplifiers, data latches, logic circuits and analog circuits, as described above. In embodiments of the present disclosure, the CuA includes a state machine or sequencer to control and implement memory operations at the storage transistors in each tile. By incorporating a state machine in each CuA, multiple tiles in a memory die can be accessed in parallel for concurrent memory operations.

In one exemplary embodiment, each tile in a memory die includes 8 active layers, that is, 8 layers of storage transistors. Each active layer includes 2 k bit lines (or 2 k active stacks) with storage transistors formed on both sides of the bit lines and each tile includes 4 k word lines (gate electrodes), for a total of 8M bits per layer and 64M bits or 64M storage transistors in one tile.

In some embodiments, memory operations on the memory die are carried out in units of a memory page of memory data, also referred to as an access unit of memory data. Each memory access operates on one memory page in a memory bank (or tile) in the present embodiment. More specifically, the bit lines of the storage transistors in a memory page are selected at the same time and the storage transistors are sensed simultaneously to provide read data or the storage transistors are driven in the same write operation to store write data. In one example, a memory page of memory data is 512 bits. Accordingly, each time a read or write operation is performed, 512 storage transistors are accessed within a tile. In one embodiment, each memory access activates one word line (WL) which is associated with 32 memory pages and one of the 32 memory pages is selected for memory operation by selecting the bit lines associated with the storage transistors in the selected memory page.

In embodiments of the present disclosure, the support circuits (CuA) for each tile include the same number of sense amplifiers as the number of data bits in a memory page for sensing the read out data. Accordingly, in each read operation, all of the sense amplifiers are used for reading out stored data and no additional address bit for selecting a subset of the sense amplifiers is needed. This is in contrast to traditional memory devices where one or more column address bits are needed to select a subset of sense amplifier to provide the read data. By providing the same number of sense amplifiers in the CuA as the number data bits in the memory page, the size of the CuA can be kept small to allow the CuA to be formed under each tile. Meanwhile, the memory operation is simplified by eliminating the address bit needed to select certain sense amplifiers. In some embodiments, the support circuits may include additional sense amplifiers for reading other data from the memory array during a memory operation, such as refresh pointer data.

In one embodiment, the interconnect structures 45 (FIG. 3) for each memory channel include connect structures for at least the number of data bits in a memory page. In one example, each set of the interconnect structures 45 includes 300 TSVs for each memory channel for outputting 512 data bits in a memory page over two clock cycles (256 bits each clock cycle) and additional data bits for error correction and control signals.

In the present description, the memory structure 50 of FIG. 4(a) includes storage transistors that implement charge trapping as the data storage mechanism and the memory structure 50B in FIG. 4(b) includes storage transistors that implement ferroelectricity as the data storage mechanism. The exact nature of the data storage mechanism being implemented in the memory structure of the present invention is not critical to the practice of the present invention. The biasing conditions applied to the storage transistors for read and write operations are a function of the data storage mechanism being implemented, as is understood by one skilled in the arts. For illustrative purposes, the biasing conditions for ferroelectric storage transistors will be used in the following description.

Furthermore, in the above-described embodiments, the tile based support circuits or modular control circuit (CuA) for each tile is described as being formed in or on the same semiconductor substrate on which the arrays of storage transistors are formed. In alternate embodiments, the modular control circuit (CuA) may be formed on a separate semiconductor substrate, different from the semiconductor substrate on which the storage transistors are formed. In such configurations, the memory arrays of storage transistors are formed on a first semiconductor die and the modular control circuits for each array of storage transistors are formed on a second semiconductor die. A memory device is formed by electrically and mechanically connecting the first semiconductor die to the second semiconductor die so that each memory array and an associated modular control circuit form a tile in the memory device and the memory device includes an array of tiles formed by bonding of the first and second semiconductor dies. The tiles, including the modular control circuits and the associated memory arrays, may be individually addressed by an external memory controller.

For instance, a tile may be formed by two semiconductor dies with the memory array portion formed on a first semiconductor die and the modular control circuit formed on a second semiconductor die. The second semiconductor die may be bonded to the first semiconductor die through interconnect structures formed at the underside (or bottom) or the topside of the memory array portion. For example, the interconnect structures may be hybrid bonds. Forming the memory array portion and the modular control circuit on separate semiconductor dies has the beneficial effect of enabling the fabrication processes to be separately optimized for the memory circuits and the control circuits.

Figure 5:
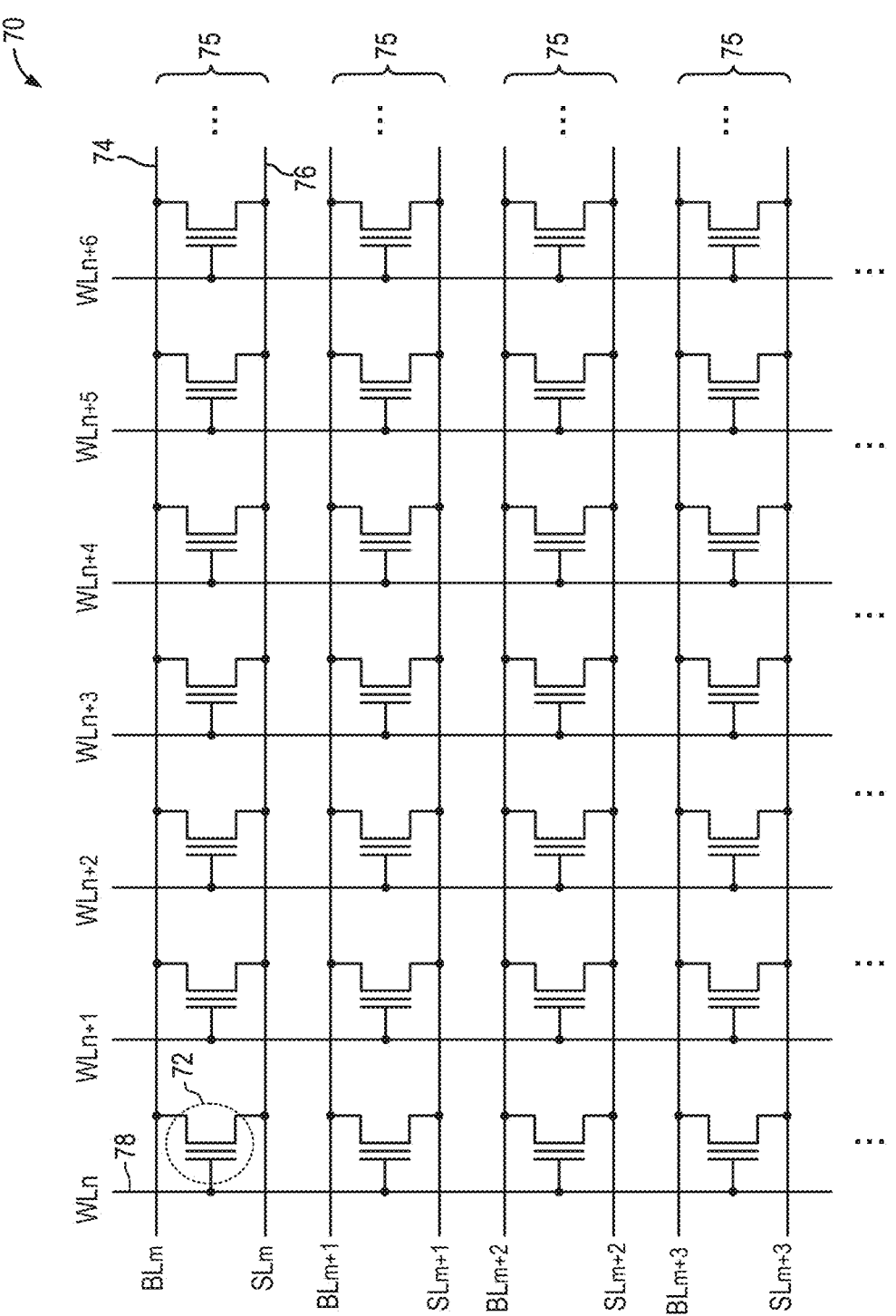
FIG. 5 is a circuit diagram illustrating a memory array of NOR memory strings in embodiments of the present disclosure.

In some embodiments, the circuitry of each modular control circuit may be partitioned with some of the control circuits formed under or above the memory arrays of storage transistors in the first semiconductor die and remaining control circuits formed in the second semiconductor die. For example, the bit line selector/driver circuits for each tile may be formed in or on the semiconductor substrate of the first semiconductor die under the respective memory array. Alternately, in another example, the bit line selector/driver circuits for each tile may be formed as vertical thin film transistors above the respective memory array (opposite the semiconductor substrate). In this manner, the first semiconductor die only needs to provide global bit line connections to the second semiconductor die. As thus configured, the memory device of the present invention may be constructed in various manner to provide an array of tiles of storage transistors with modular control circuits. The memory device may be formed on a monolithic semiconductor die or may be formed in a multi-die configuration to enable fabrication process optimization between the memory circuits and the support circuits. Whether formed monolithically or in a multi-die configuration, the memory tiles, including the modular control circuits and the associated memory arrays, may be individually addressed by an external memory controller FIG. 5 is a circuit diagram illustrating a memory array of NOR memory strings in embodiments of the present disclosure. FIG. 5 illustrates a memory circuit of NOR memory strings that can be formed by the memory structure of FIG. 4(*a*) or 4(*b*). Referring to FIG. 5, a memory array 70 of storage transistors 72 is illustrated and represents a portion of the storage transistors in the 3-D memory array of FIG. 4(*a*) or 4(*b*). The memory array 70 includes multiple memory strings 75 formed on each active layer, each memory string 75 includes a series of storage transistors 72 connected in parallel with each other between a common bit line 74 and a common source line 76. The memory string 75 is sometimes referred to as a NOR memory string as the storage transistors are connected in parallel with each other in a NOR configuration. The NOR memory string 75 of storage transistors forms a basic building block from which a two-dimensional or three-dimensional array of storage transistors can be formed. That is, multiple strings of storage transistors can be used to form a two-dimensional array of storage transistors, or a plane of storage transistors. A three-dimensional array of storage transistors can be formed by stacking multiple planes of the two-dimensional array of storage transistors. In the present description, the semiconductor memory device is implemented by an array or arrays of strings of storage transistors and the exact configuration or arrangement of the strings of storage transistors is not critical to the practice of the present invention.

Each storage transistor 72 is a thin film storage transistor including a drain terminal connected to the bit line 74, a source terminal connected to the source line 76, a gate terminal or control terminal connected to a word line 78 and a data storage film in which data is stored for the storage transistor. For example, the data storage film can be a set of charge storage films or a ferroelectric dielectric layer. More specifically, the gate terminals of the storage transistors 72 are driven by respective word lines (WLx) 78 where each word line WLx activates one storage transistor 72 in one NOR memory string 75, while simultaneously activating other storage transistors in other NOR memory strings. As thus configured, when a word line WL is selected, all of the storage transistors 72 that are connected to the same word line (e.g. WLn) are activated. In operation, a selected word line activates P number of memory pages, each memory page including Q number of storage transistors associated with Q number of NOR memory strings. The bit lines belonging to the selected memory page are selected for memory operation. Accordingly, a memory page is selected by a selected word line and selected bit lines to access Q number of storage transistors in the selected memory page.

For example, the bit line of each memory string is coupled to a sense amplifier circuit to sense the stored data in the memory read operation. The sense amplifier circuit and other circuit elements as well as the control signals for facilitating the operation of the sense amplifier and the memory array are not shown in FIG. 5. For example, the bit line may include a discharge transistor to discharge the bit line after a read or write operation. In another example, the sense amplifier circuit may include transistors and devices to implement sense amplifier reset functions. Furthermore, the sense amplifier circuit may include a latch circuit for latching the output of the sense amplifier. An exemplary sense amplifier circuit will be described in more details below with reference to FIG. 6.

In embodiments of the present disclosure, the memory device includes storage transistors (or "memory cells") that can be read, programmed or erased. The program and erase operations are sometimes collectively referred to as a write operation. The memory device implements memory operations including a read operation to read data from the storage transistors and a write operation to write data into the storage transistors. The memory device may implement other operations, such as a refresh operation, which will not be described in the present description. In the present description, the write operation includes two operations or two phases—the erase operation or the erase phase and the program operation or the program phase. In the present embodiment, the erase operation is associated with writing a first logical state (e.g. logical "1") into a memory cell and the program operation is associated with writing a second logical state (e.g. logical "0") into the memory cell. It is instructive to note that the specific logical state assigned to the erase or program operation is arbitrary and not critical to the practice of the present invention. In other embodiments, the erase step can be associated with writing a logical "0" into a memory cell and the program step is associated with writing a logical "1" into the memory cell. In the present embodiment, the erase operation can be referred to as a Set 1 operation and the program operation can be referred to as a Set 0 operation. The description herein refers to a write operation with a single erase phase and a single program. It is instructive to note that the write operation described herein is illustrative only and not intended to be limiting. In some embodiments, the write operation may include one or more erase phases and one or more program phases.

In the memory array 70, each storage transistor of a NOR memory string is read, programmed or erased by suitably biasing its associated word line 78 (WLx) and the common bit line 74 (BLy) it shares with other storage transistors in the NOR memory string 75. The storage transistor's associated word line is shared with storage transistors of NOR memory strings on other planes that are aligned with the storage transistor along the direction normal to the planar surface of the semiconductor substrate ("vertical direction"). Each word line may also be shared between two storage transistors from neighboring NOR memory strings on the same plane (see FIGS. 4(*a*) and 4(*b*)). In some embodiments, the common source line is normally electrically floating, that is, not connected to any electrical potential. During read, program or erase operation, the common source line of the NOR memory string is typically provided a relatively constant voltage that is maintained either by a voltage source or by the charge in an associated capacitor ("virtual ground"), such as the parasitic capacitance of the common source line. For example, the common source line of the NOR memory string can be biased to a given voltage by a precharge operation where the desired voltage is provided on the common bit line and the common source line is charged to the voltage on the bit line through one or more precharge transistors. To program or erase the storage transistor, for example, a substantial voltage difference (e.g., 8 volts for charge storage type storage transistor and 3V for ferroelectric storage transistor) is imposed across the common bit line and the word line. To mitigate disturb to a non-selected storage transistor, a predetermine voltage difference that is significantly less than the required voltage to program or erase may be imposed across the non-selected storage transistor's associated word line and its common bit line, so as to inhibit undesired erasing or programming of the non-selected storage transistor.

Figure 6:
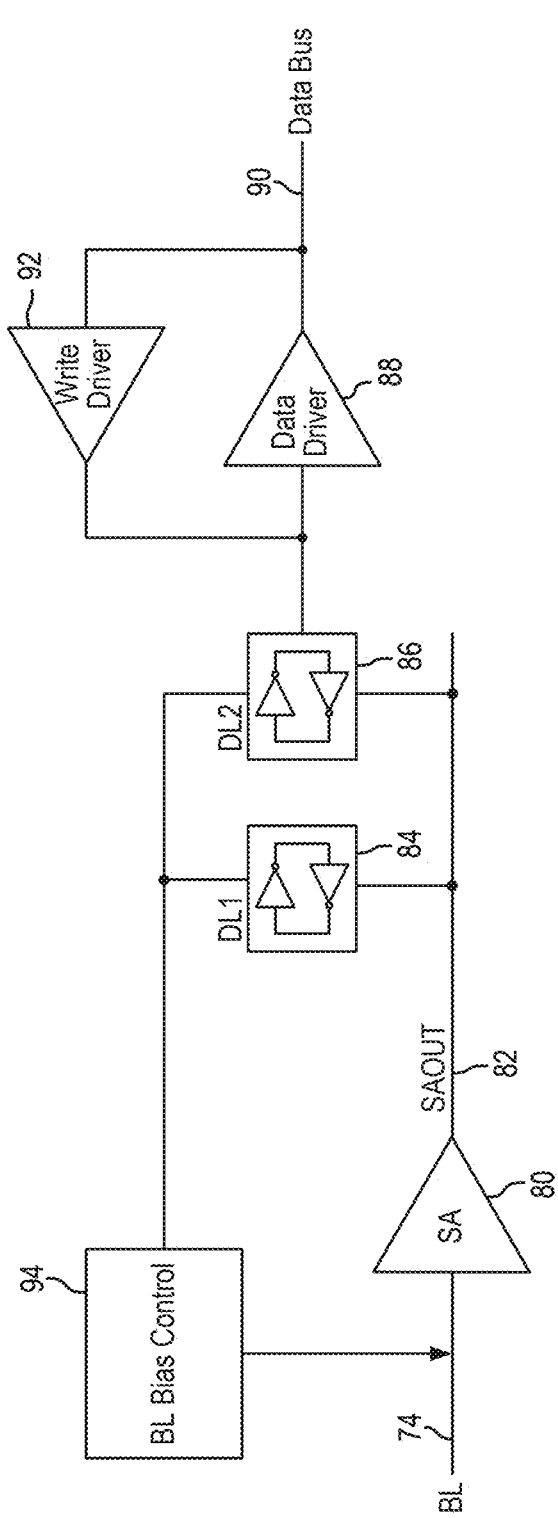
FIG. 6 is a circuit diagram illustrating an exemplary support circuits connected to the bit line of the NOR memory string in embodiments of the present disclosure.

FIG. 6 is a circuit diagram illustrating an exemplary support circuits connected to the bit line of the NOR memory string in embodiments of the present disclosure. In particular, FIG. 6 illustrates the sense amplifier circuit and related circuit elements for performing read and write memory operations. Additional circuit elements and control signals are omitted to simplify the discussion. Referring to FIG. 6, each bit line 74 is connected to a sense amplifier 80 through a bit line selector (not shown). In actual implementation, each bit line selector is connected to P number of bits lines to select one out of P number of bit lines for sensing at the associated sense amplifier. In other words, each bit line selector is connected to the bit line of same data bit across P number of memory pages. In the case an access unit includes 512 bits of memory data, 512 bit line selectors are provided to select the bit lines of the selected memory page for access. As thus constructed, a selected word line activates P number of memory pages (such as 32 memory pages) and the set of bit line selectors at each sense amplifier selects the bit lines associated with the selected memory page for access. FIG. 6 illustrates a selected bit line 74 connected to the sense amplifier 80. The bit line selector and other bit lines that share the same sense amplifier are omitted in FIG. 6 for simplicity.

In a read operation, the sense amplifier 80 senses a voltage signal indicative of the bit line current on the selected bit line to determine a logical state of the selected storage transistor and generates a sense amplifier output SAOUT (node 82) in response to the sensing. In the present embodiment, the sense amplifier output SAOUT (node 82) is coupled to a pair of data latches 84, 86. In the present embodiment, the first data latch 84 (DL1) may be used to store data locally to the memory tile, such as read data for refresh operation, and the second data latch 86 (DL2) may be used to store data to be exchanged with the memory controller, such as read data retrieved from the selected storage transistor or write data received from the memory controller. It is instructive to note that the sense amplifier circuit configuration including two data latches 84, 86 is illustrative only and not intended to be limiting. Other sense amplifier circuit configuration are possible. In one embodiment, the sense amplifier itself may be configured to incorporate data latching capability so that the sense amplifier 80 can itself function as a data latch to store read data. In that case, the support circuits for each tile includes three data latches, DL1, DL2 and the sense amplifier as the third data latch DL3. In that case, the third data latch DL3 (the sense amplifier) may be used to store the read data retrieved from the selected storage transistor and the second data latch DL2 is used to store the write data received from the memory controller.

In a read operation, the sense amplifier 80 senses the voltage signal on the selected bit line 74 which is indicative of the bit line current associated with the erased or programmed state of the selected storage transistor. The sense amplifier 80 generates the sense amplifier output signal SAOUT having a logical state indicative of the sensed bit line voltage signal. In one embodiment, in the read operation, the read data is stored in the data latch DL2. The read data is driven onto the data bus 90 by a data driver 88 to be provided to the memory controller. In practice, the data driver 88 may be controlled by a clock signal to drive the read data onto the data bus 90 synchronized with the clock signal.

In a write operation, the write data from the memory controller is provided to the data bus 90 and a write driver 92 drives the write data to the data latch DL2. The write driver may also be controlled by a clock signal to drive the write data into the data latch DL2 in response to the clock signal. To perform the erase or program operation, a bit line bias control circuit 94, under control of the state machine in the CuA, drives the bit line 74 to program or erase voltages according to the logical state of the write data to be written to the storage transistor.

Memory Controller Architecture

Figure 7:
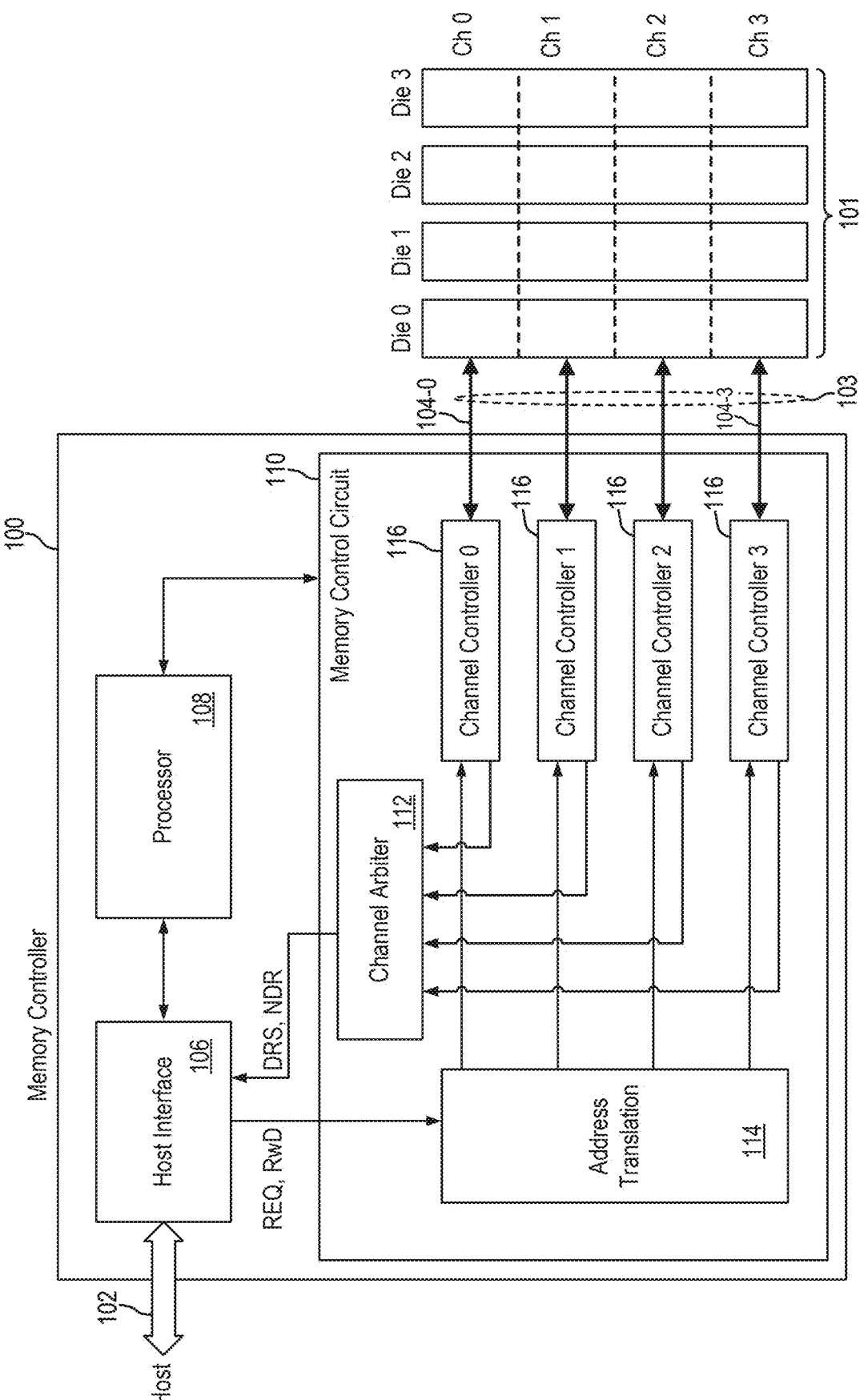
FIG. 7 is a schematic diagram of a memory controller in embodiments of the present disclosure.

FIG. 7 is a schematic diagram of a memory controller in embodiments of the present disclosure. The memory controller 100 of FIG. 7 may be used to implement the memory controller 14 in memory module 30 of FIG. 2(*a*) in some examples. In particular, the memory controller 100 is configured to operate memory devices configured with multiple independently accessed memory channels. Referring to FIG. 7, the memory controller 100 includes a host interface circuit 106 for interfacing with a host, a memory control circuit 110 for interfacing with a memory device 101, and a processor 108 controlling the operation of the host interface circuit 106 and the memory control circuit 110. The memory controller 100 operates based on one or more clock signals. For example, the host interface circuit 106 may use a clock signal at a first clock frequency while the memory control circuit 110 and the processor 108 may use a clock signal at a second clock frequency, different from the first clock frequency. Clock signals for operating the memory controller are not shown in FIG. 7 to simplify the discussion but it is understood that the memory controller 100 operates based on one or more clock signals.

The host interface circuit 106 is coupled to a host interface bus 102 for communicating with a host, such as a host processor. The memory controller 100, through the host interface circuit 106, receives requests from the host processor and transmit responses to the host processor. For example, the memory controller 100 receives read requests and write requests with write data from the host over the host interface bus 102. The memory controller 100 provides read data and write completion responses to the host over the host interface bus 102. In one exemplary embodiment, the host interface circuit 106 communicates with the host over a PCIe 5.0 serial bus using the CXL (Compute Express Link™) protocol. Under the CXL protocol, the host processor issues requests without data (REQ) as the read requests and requests with data (RwD) as the write requests with write data. Furthermore, under the CXL protocol, the memory controller 100 issues responses with data (DRS) as the read data and responses without data (NDR) as the write completion response.

The memory control circuit 110 is configured to operate on memory channels of a memory device 101 and communicate with the memory device over a memory array interface 103. In embodiments of the present disclosure, the memory device 101 is a memory stack including multiple memory dies formed stacked one on top of another. In the present example, the memory stack 101 includes four memory dies—Die 0, Die 1, Die 2 and Die 3. The memory dies in the memory stack 101 are partitioned in accordance with the memory channel configuration scheme described above into N number of independently accessible memory channels. In the present example, the memory dies—Die 0, Die 1, Die 2 and Die 3—are partitioned into 4 memory channels Ch 0, Ch 1, Ch 2 and Ch 3. In other examples, the memory dies may be partitioned into 8 channels or 16 channels. Under the memory channel configuration scheme in exemplary embodiments of the present disclosure, each memory channel Ch n is formed across all of the semiconductor dies in the memory stack 101. That is, each of memory channel Ch 0 to Ch 3 includes memory partitions from memory dies Die 0 to Die 3. The memory control circuit 110 communicates with the memory stack 101 over the memory array interface 103 which includes individual memory channel interfaces 104-0 to 104-3 for each respective memory channel Ch 0 to Ch 3. In particular, each memory channel interface 104-n includes data and command interfaces for the respective memory channel.

The configuration of the memory device 101 in FIG. 7 is illustrative only and not intended to be limiting. The memory control circuit 110 is configured to operate a memory device in any configuration, such as a single semiconductor memory die or multiple semiconductor dies. The memory control circuit 110 is configured to operate on the memory channels of a memory device where the memory channels may be configured in many ways. The exact channel configuration of the memory device is not critical to the practice of the present invention. In FIG. 7, the memory device is a memory stack and the channel configuration is across the memory dies in the stack. In another example, the memory device may include multiple memory dies (e.g. k memory dies) arranged in a planar fashion adjacent the memory controller, where each memory die includes multiple memory channels (e.g. n memory channels). The memory control circuit 110 of the memory controller 100 can be configured to operate the k*n memory channels across the k memory dies.

The memory control circuit 110 includes a channel controller 116 that is instantiated N times to provide one channel controller 116 for each memory channel. In the present example, 4 instances of the channel controller 116 are provided, including Channel Controller 0 to Channel Controller 3, for the four memory channels of the memory stack 101. Each channel controller 116 communicates with a memory channel over the respective memory channel interface 104-n. In this manner, each memory channel Ch 0 to Ch 3 of the memory stack 101 is independently accessible and the memory channels Ch 0 to Ch3 can be accessed in parallel to realize high bandwidth memory access.

The memory control circuit 110 further includes an address translation circuit 114 and a channel arbiter 112, both communicating with all of the channel controllers 116. The host interface 106 receives incoming requests from the host and the incoming requests, such as read requests (REQ) or write requests (RwD), are provided to the address translation circuit 114 of the memory control circuit 110. The address translation circuit 114 decodes the logical address in each request to determine which of the memory channels the request should be sent and transmits the requests to the channel controller 116 of the designated memory channel. On completion of a memory operation, each channel controller 116 provides responses, such as the read data or the write completion response, to the channel arbiter 112. The channel arbiter 112, under the control of channel arbitration logic, selects the responses to be transmitted to the host interface 106. For example, the channel arbitration logic may return responses in the same order as the corresponding requests being received. In another example, the channel arbitration logic may implement a credit management scheme to determine which response from which memory channel is to be returned to the host processor. In some examples, the channel arbitration logic may be implemented in the processor 108.

Figure 8:
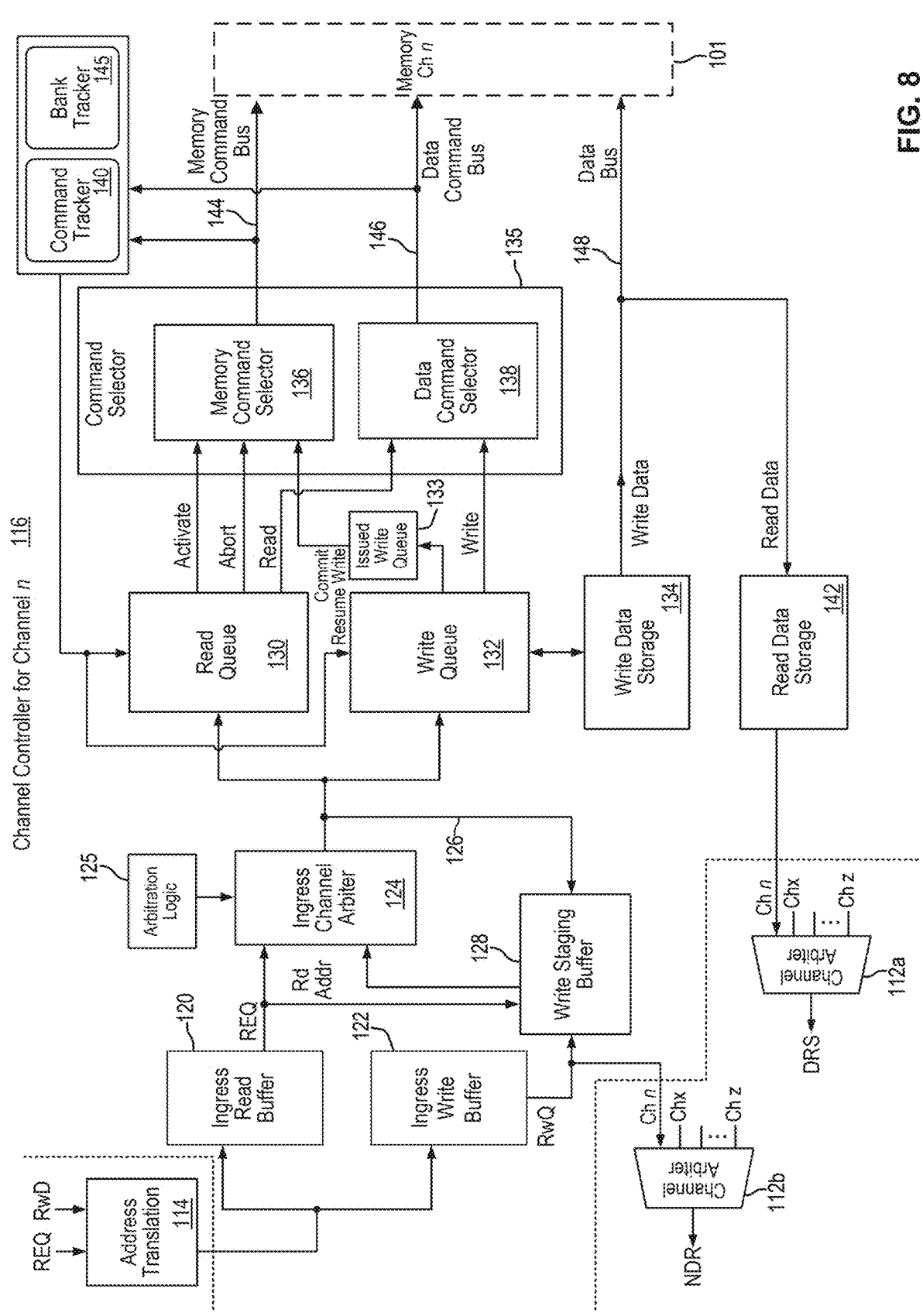
FIG. 8 is a schematic diagram of a channel controller which can be implemented in the memory controller of FIG. 7 in embodiments of the present disclosure.

FIG. 8 is a schematic diagram of a channel controller which can be implemented in the memory controller of FIG. 7 in embodiments of the present disclosure. As described above with reference to FIG. 7, the memory controller 100 receives incoming requests on the host interface bus 102 and the requests are provided to the address translation circuit 114 of the memory control circuit 110. The address translation circuit 114 decodes the logical address in the request to generate the physical address of the memory device 101 associated with the logical address. In the present description, the physical address is also referred to as the memory address. Based on the channel address indicated in the decoded physical address, the requests are provided to the respective channel controller 116. In some embodiments, the address bits for selecting the memory channel is the lower order address bits of the physical address. In this manner, the incoming requests are distributed over the different memory channels, reducing channel conflicts and increasing memory utilization. As a result of the address translation, each channel controller 116 receives incoming requests for read or write operation that are designated for its memory channel.

It is instructive to note that the operation of the channel controller 116 is based on one or more clock signals. Typically, the channel controller 116 operates based on a controller clock signal at a given clock frequency. Signals transmitted into and out of the channel controller may cross over different clock domains (that is, different clock frequencies). In that case, buffers or clock crossing FIFO circuits may be used for signals crossing over two different clock frequencies. In the present description, clock signals and related clock crossing circuits are not shown in FIG. 8 to simplify the discussion. It is understood that the operation of the channel controller is synchronized to the controller clock signal. For instance, the channel controller 116 sends commands to the memory device 101 at each clock cycle of the controller clock signal. In one example, the controller clock signal has a frequency of 500 MHz and the channel controller sends a command o the memory device every clock cycle or every two clock cycles, that is, every 2 ns or every 4 ns, a command is sent to the memory device where there is a command available.

In some embodiments, the address translation circuit 114 decodes the logical address in the request to a physical address which includes the memory channel address, the memory bank address, the memory die address, the word line address and the memory page address. The decoded physical address therefore selects a memory channel out of the N memory channels and selects a memory die out of the K number of memory dies in the selected memory channel. The physical address further selects a memory bank (or a memory tile) within the selected memory die of the selected memory channel. In the selected memory bank, the physical address selects a word line, which activates P number of memory pages in the memory tile. The physical address finally selects one memory page out of the P memory pages associated with the selected word line. As described above, each memory page includes Q number of data bits, such as 512 bits.

Referring to FIG. 8, the channel controller 116 receives incoming read or write requests from the address translation circuit 114 and stores the requests into separate ingress buffers. In particular, incoming read requests are stored in an ingress read buffer 120 and incoming write requests are stored in an ingress write buffer 122. The incoming write requests are then provided to and stored in a write staging buffer 128 as pending write requests. An ingress channel arbiter 124 regulates the flow of the pending read and write requests to a read queue 130 and a write queue 132, based on one or more predetermined priority rules provided by a read/write arbitration logic circuit 125. In particular, the ingress channel arbiter 124 arbitrates the pending read requests from the read ingress buffer 120 and the evicted pending write requests from the write staging buffer 128 to select requests to send to the read and write queues 130 and 132, based on the predetermined priority rules. For example, the ingress channel arbiter 124 may give priority to read requests unless the write staging buffer is almost full for one or more memory banks. The ingress channel arbiter 124 may further consider attributes such as the age of a request or the memory bank status in the priority determinations. In another example, the ingress channel arbiter 124 forwards read requests to the read queue or forwards write requests to the write queue in a manner to avoid excessive bank conflicts.

The read queue 130 and write queue 132 store the read and write requests and generate commands for the memory device 101 based on the requests. The read queue 130 and the write queue 132 generate commands which bid for access to the memory device 101 through a command selector 135, sometimes referred to as a global arbitration circuit or a global scheduler. The command selector 135 selects the commands to be sent to the associated memory channel of the memory device 101 to perform the memory operation at the destination memory address associated with each respective request. The command selected by the command selector 135 is sometimes referred to as a "winning command."

In embodiments of the present disclosure, the channel controller 116 of FIG. 8 is adapted for a memory device where the write latency is much longer than the read latency. A salient feature of the channel controller of the present invention is that the channel controller is configured to mask what may be a long write latency from the host. In some embodiments, the channel controller 116 stores the incoming write requests and write data in the write staging buffer 128 and returns the write completion responses to the host prior to the write operation actually being performed at the memory device, that is, prior to the write data being stored onto the memory device. Meanwhile, the channel controller 116 manages the write requests and performs the write operation to the memory device in the background of the host operation so that any extended write latency at the memory device is hidden from the host system and the host system can operate as if there is only a nominal write latency at the memory device.

In some embodiments, in the channel controller 116, each write request stored in the ingress write buffer 122 is first evicted to the write staging buffer 128 and the pending write request entries in the write staging buffer 128 are then provided to the ingress channel arbiter 124 for arbitration with the read requests from the read ingress buffer 120. In one example, the write staging buffer 128 can be used to prevent too many write requests to the same memory bank of the memory channel from being sent to the write queue 132 which may fill up the write queue and causing backpressure to the ingress write buffer 122. In some embodiments, the write staging buffer 128 is sized to store a large number of write requests, sufficient to handle the write latency of the memory device being masked from the host. In the present embodiment, eviction of a write request from the ingress write buffer 122 to the write staging buffer 128 signals a write completion response to the host. That is, whenever a write request is evicted or removed from the ingress write buffer 122 and transferred to the write staging buffer 128, a write completion response for that write request is sent out to the host. From the host's perspective, that particular write request is completed while the channel controller 116 maintains and handles the write request to be completed at the memory device 101. In the present example, the write completion response (e.g. an NDR under the CXL protocol) for the respective memory channel n is provided to the channel arbiter 112*b*, which receives the write completion responses from all of the memory channels (e.g. Ch n, x to z). The channel arbiter 112*b* selects, based on predetermined arbitration rules, the write completion response from the memory channels to be provided to the host, through the host interface.

As described above, the ingress channel arbiter 124 arbitrates the read requests from the ingress read buffer 120 and the write requests from the write staging buffer 128 to select requests to send to the read and write queues, based on predetermined priority rules. In another example, the ingress channel arbiter 124 forwards read requests to the read queue or forwards write requests to the write queue in a manner to avoid excessive bank conflicts. For example, if there is a write request pending for a given memory bank of a given memory die in the write queue, the ingress channel arbiter 124 does not forward additional write requests to the same memory bank of the same memory die to the write queue but will forward write requests destined for other memory banks to the write queue instead. In this manner, the ingress channel arbiter 124 avoids sending excessive number of write requests to the same memory bank of the same memory die to the write queue 132 which may cause the write queue to fill up in the case the memory device has a long write latency.

In embodiments of the present disclosure, the ingress channel arbiter 124 further evaluates the incoming read requests to determine if a read request is for the same memory address as a write request that is pending in the write staging buffer 128. In embodiments of the present disclosure, the read ingress buffer 120 forwards the memory address of the pending read requests ("read address") to the write staging buffer 128. The write staging buffer 128 determines if the read request is for the same memory address as a pending write request in the write staging buffer 128. In the event the write staging buffer 128 determines a read request has a memory address that matches the destination memory address of a pending write request in the write staging buffer, the channel controller 116 may implement various techniques to provide the write data of the matching pending write request as the read data of the read request. In one example, the read request may be satisfied by the write data from the write staging buffer 128. In another example, the channel controller 116 may forward the matching pending write request to the write queue 132 and the read request may be satisfied by the write data from the write queue 132 (or more specifically, the write data storage 134 associated with the write queue).

In the present embodiment, the read queue 130 is a data structure that stores the pending read requests for the associated memory channel. The read queue 130 stores the pending read requests with the destination memory address, such as the memory bank address and the memory page address for each read request. The read queue 130 further stores for each read request other attributes associated with the read request, such as the status of the memory bank indicated by the destination memory address and the command being processed at the memory bank, if any. The memory bank status ("bank status") is used to indicate whether the read request is eligible to be sent to the memory device. In the present embodiment, each entry in the read queue 130 can request to send an Activate command, a Read command, or an Abort command. The Activate command instructs the memory device to start sensing the stored data in the designated memory page of the designated memory bank using the sense amplifier circuits and to store the sensed data in a data latch coupled to the sense amplifier circuit (such as data latch DL2 in FIG. 6). The Read command outputs the sensed data stored in the data latch to the channel controller 116. For instance, the read data is read out of the memory device 100 and stored in a read data storage 142. The Abort command will be explained in more details below.

In the present embodiment, the write queue 132 is a data structure that stores the active write requests for the associated memory channel. The write queue 132 stores the active write requests with the destination memory address, such as the memory bank address and the memory page address for each write request. In the present embodiment, the write data for each write request is stored in a write data storage 134 in communication with the write queue 132. The write queue 132 further stores for each write request other attributes associated with the write request, such as the status of the memory bank indicated by the destination memory address and the command being processed at the memory bank, if any. The memory bank status ("bank status") is used to indicate whether the write request is eligible to be sent to the memory device. In the present embodiment, each entry in the write queue 131 can request to send a Write command. The Write command is sent to the memory device with the accompanying write data stored in the write data storage 134 to instruct the memory device to write the data into the designated memory page of the designated memory bank. In some embodiments, the write data is first stored into the data latches (such as data latch DL2 in FIG. 6) and the bit line bias control circuit drives the write data into the storage transistors.

In the present embodiment, the channel controller 116 includes an issued write queue 133. The write queue 132 allocates an active write request entry to the issued write queue 133 when the active write request is the winning command at the command selector 135. In particular, the write queue 132 sends the Write command with the write data to the memory device 101 in response to an active write request being selected by the command selector 135. For example, the write data is sent to the memory device 101 and is stored in the data latches (e.g. data latch DL2) of the designated memory page. The write queue 132 then transfers the write request to the issued write queue 133. The issued write queue 133 handles the remaining write operation flow. For example, each entry in the issued write queue 133 can send a Commit command to instruct the memory device 101 to initiate the bias voltage sequence to write the previously sent write data into the storage transistors at the destination memory address. For instance, the Commit command is sent to activate the program, erase or refresh operation flows at the support circuit (CuA) of the designated memory tile which drives the appropriate voltages onto the bit lines of the storage transistors associated with the selected memory page. The issued write queue 133 may deallocate a write request when the write flow is done, that is the erase and program operation at the storage transistors have been completed. Furthermore, in the present embodiment, each entry in the issue write queue 133 can also send a Resume Write command, which will be explained in more details below.

In some embodiments, the issued write queue 133 stores the issued write requests until completion. It is instructive to note that the use of the issued write queue 133 is optional and may be omitted in other embodiments. In other embodiments, issued write requests may be stored in the write queue 132 itself until completion of the write request.

In the present embodiment, an active read or write request in the respective read/write queue is eligible for bidding access when the memory bank it is destined for does not currently have a memory operation being performed. For example, a read or write request is eligible when the memory bank it is destined for is not currently being read from, or written to. Eligible read or write requests bid for access to the memory device 101 through the command selector 135. The command selector 135 arbitrates the commands received from eligible read or write requests to determine the command ("the winning command") to send to the memory device 101 at each clock cycle (or each x number of clock cycles).

In embodiments of the present disclosure, the command selector 135 selects the commands to send to the memory device 101 based on predefined priority rules. In the present embodiment, the command selector 135 transmits commands to the respective memory channel of the memory device over two command busses: (1) a memory command bus 144 for commands that do not involve data, such as the Activate command, the Abort command, the Commit command and the Resume Write command; and (2) a data command bus 146 for commands involving data, such as the Read command and the Write command. In some embodiments, the command selector 135 includes a memory command selector 136 and a data command selector 138 for selecting from eligible commands provided by the read queue 130 and write queues 132. The memory command selector 136 selects commands to be sent on the memory command bus 144 to the memory device, and the data command selector 138 selects commands to be sent on the data command bus 146 to the memory device. In the present embodiment, commands that are provided to the memory command selector 136 include, for example, the Activate command for setting up a read operation. The commands transmitted on the memory command bus 144 are not associated with any read or write data. Meanwhile, commands that are provided to the data command selector 138 include, for example, the Read command and the Write command. Synchronized to a write command being provided on the data command bus 146, the associated write data is provided on a data bus 148 from the write data storage 134. In response to the Read command, the memory device 101 provides the read data on the data bus 148 which is then stored in the read data storage 142. The read data is provided as the read data response for the memory channel.

In the present example, the read data response (e.g. DRS) for the respective memory channel n is provided to the channel arbiter 112*a*, which receives the read data response from all of the memory channels (e.g. Ch n, x to z). The channel arbiter 112*a* selects, based on predetermined arbitration rules, the read data response from the memory channels to be provided to the host, through the host interface.

In embodiments of the present disclosure, the channel controller 116 is configured to operate in a manner to maximize the performance of the memory device. For example, in one embodiment, the channel controller is configured to operate in a greedy mode wherein the channel controller always tries to send commands to the memory device for execution, as long as there are requests pending. Accordingly, the read queue 130 and the write queue 132 will always send eligible commands to the command selector 135 to bid for access to the memory device. Meanwhile, the command selector 135 operates based on predefined priority rules to select the winning command to send to the memory device each x clock cycle (x being 1 or more). In one example, the command selector 135 may be configured in a Read Priority mode where commands for write operations are sent in empty clock cycles between commands for read operations. In another example, the command selector 135 may be configured in a Write Priority mode where commands for read operations are sent in empty clock cycles between commands for write operations. In some embodiments, the predefined priority rules may include fixed priority rules or dynamic priority rules.

In operation, the read queue 130 and the write queue 132 store active read and write requests for the memory device, each read/write request being associated with a destination memory page in a destination memory bank of a destination memory die of the memory channel. The read queue 130 and write queue 132 determine which of the pending requests stored therein are eligible to be executed at the memory device. The read queue 130 and write queue 132 always try to send all eligible commands to the command selector 135. The command selector 135 arbitrates the commands using the predefined priority rules and selects a winning command at each clock cycle (or x clock cycles). The winning command will then be sent to the memory device 101 over the respective memory command bus 144 or data command bus 146 (with the write data on the data bus 148). To keep track of the memory operation being performed at the memory device, the winning command is provided to a command tracker 140 which operates to track the progress of each command sent to the memory device. The winning command is also provided to a bank tracker 145 which tracks the status of each memory bank in the memory channel. The read queue 130 and the write queue 132, as well as the issued write queue 133, use the information in the bank tracker 145 and the command tracker 140 to determine the status of each memory bank to which a request is pending and based on the bank status, determine commands that are eligible for bidding for access at the command selector 135.

In some embodiments, the bank tracker 145 is a data structure and stores banks status data for each memory bank in the memory channel where the bank status indicates whether a given memory bank is inactive (and thus eligible to receive commands) or is busy (thus not eligible to receive commands). The bank tracker may further store data indicating the memory operation being performed at a busy memory bank. The read queue 130 and the write queue 132 obtain the status of each memory bank associated with respective pending requests from the bank tracker 145.

In some embodiments, the command tracker 140 tracks each command sent and being executed at each memory bank of the memory device based on clock timing. In one embodiment, each command being executed at the memory device 101 is assigned a predetermined command execution time. The command tracker 140 tracks commands issued for execution at the memory device and indicates a given command is completed at the expiration of the predetermined command execution time assigned to that command. In some examples, the progress of each command being executed is tracked using clock cycles. In one example, the commands sent to the memory device 101 share the same time base, for example, a command is sent every 4 ns. In some embodiments, the command tracker 140 is implemented as a shift register. In one example, a winning command is allocated at the head of the shift register and is shifted every clock cycle so as to keep track of the progress of the command being executed at the memory device. In some embodiments, configurable tap points are provided in the shift register to indicate relevant timing restrictions. A command progressing through the shift register is compared with each tap point. A match at a tap point indicates that the time or clock cycles from the command being issue to the given tap point has passed. In this manner, the command tracker keeps track of the progress of each command issued to the memory device. A command that has progressed past the tap point associated with the assigned command execution time will be indicated as a completed command and the associated memory bank indicated as free.

As thus configured, the read queue 130 and the write queue 132 determine the bank status and the memory operation in progress at each memory bank in which a request is pending. The bank status and memory operation progress information allows the read queue and the write queue to determine whether a pending request is associated with a memory bank that is busy or a memory bank that is inactive or free. For pending requests associated with inactive memory banks, the read queue and the write queue issue eligible commands to bid for access. The memory command selector 136 and the data command selector 138 of the command selector 135 select the winning command among the eligible commands in each clock cycle to send to the memory device 101. The command tracker 140 and the bank tracker 145 update their respective status in response to the winning command at each clock cycle. In this manner, the winning command is identified to the read queue 130 and the write queue 132 and the bank status associated with the memory bank of the winning command is updated to busy. Any pending request to the same memory bank will now become ineligible for bidding.

In the present description, the structure and operation of the channel controller are described to illustrate the process flow from receiving incoming requests to generating commands for the memory device. It is understood that the channel controller may include other circuit elements not shown or described to support the memory operation. For example, the channel controller may implement error detection and correction and the channel controller may include an ECC encoder to perform error correction encoding and an ECC decoder to detect and correct for bit errors, thereby preventing data loss. ECC circuits and other support circuits that may be included in the channel controller are omitted in FIG. 8 to simplify the discussion.

Write Abort Scheme

In some cases, the memory device may have asymmetric read and write latency. In some cases, the time to write data to the storage transistors of the selected memory address may be longer as compared to the read latency (i.e. the time to obtain read data from the storage transistors of the selected memory address). For example, the read latency may be 70 ns while the write latency may be 300 ns. The long write latency is usually due to the write operation include multiple steps, such as erase and program operations, or a verification operations. As a result of the tile-based memory configuration and the semi-autonomous operation of different tiles or memory banks in the memory device, the memory controller can realize a high write bandwidth by having multiple write operations in progress in parallel across multiple memory banks (or memory tiles). However, the write bandwidth can become limited or can be reduced when the memory controller issues multiple memory requests to the same memory bank, especially multiple write operations, resulting in bank conflicts.

In embodiments of the present disclosure, a memory controller in a memory module implements a write abort scheme where a write operation in progress at a given memory bank of the memory device can be terminated to perform a read operation at the same memory bank. The write operation can be resumed subsequent to the read operation. In this manner, a long write latency of the memory device does not cause a read request to the same memory bank to have a long latency. In practice, the read command that may terminate a write operation is directed to a different memory page in the same memory bank as the memory page at which the write operation in progress. A read operation to the same memory page of the same memory bank of the write operation may be satisfied by the write data stored in the write staging buffer 128 of the memory controller using the "read hitting write" logic circuit 126 (FIG. 8). In embodiments of the present disclosure, the write abort scheme is implemented in each channel controller of the memory controller.

In some embodiments, the write abort scheme can be applied to a write operation in progress where the write operation may originate from a write request or originate from a refresh command. In the present embodiment, the memory device may be a quasi-volatile memory device that needs to be refreshed at a predetermined time interval, usually much less frequently than DRAM devices. The memory controller, through each channel controller, issues refresh commands to the memory device to initiate a refresh operation to certain memory banks or groups of memory banks of each memory channel. A refresh operation involves reading data from the designated storage transistors and then writing the same data back to the storage transistors, in the process resetting the charge store or the threshold voltage of the storage transistors for the respective logical states. In the present description, a "write operation in progress" may refer to a write operation resulting from a write request from the host or a write operation carried out as part of a refresh operation initiated by the memory controller.

The write abort scheme of the present disclosure is applicable in a memory device performing memory operations on a bank-by-bank basis. That is, each memory bank (or memory tile) can only have one memory operation being performed at a time. Thus, a read request that arrives after a write request at the same memory bank may experience exceptionally long latency if the read request has to wait for the write operation to complete. In one example, the memory device may have a read latency of 100 ns and a write latency of 1 µs. In that case, a read request to a memory bank that arrives while a write operation is in progress at the same memory bank may have to wait for a time duration much longer than the read latency if the read request has to wait for the completion of the write operation. The write abort scheme of the present disclosure allows the read request to a given memory bank or tile to terminate certain write operations at the same memory bank or tile in favor of executing the read request so that the desired low read latency can be maintained.

A salient feature of the write abort scheme of the present disclosure is that the write abort scheme is implemented in the memory controller of the memory module where the memory controller manages the activities of the memory device and further implements management control over the write abort operation. In other words, the memory controller does not simply issue an abort command but rather manages the entire read, write, abort and resume operations at the memory device. In some embodiments, the memory controller keep tracks of the operation status of each command being executed at the memory device. In other words, the memory controller knows exactly what each memory bank of the memory device is doing at each clock cycle. The memory controller uses the memory bank status and memory operation progress information of each memory bank to implement an abort of write operations in an efficient manner. The write abort scheme of the present disclosure is to be distinguished from schemes implemented in conventional memories where the host may issue command to the memory device to terminate certain operation. In those cases, the host does not control or manages the memory operation other than issuing requests and receiving responses. Furthermore, the host does not monitor and does not know the status of the requests being performed at the memory device. A termination request issued by the host may be received by the memory device at any point of a memory operation and the memory device must respond accordingly, without consideration for efficiency of the memory operation being performed.

In some embodiments, the bank tracker 145 stores a status indicator for each memory bank with write operation in progress whether the memory bank is eligible for abort. The eligible for abort status is determined based on the progression of the write operation as tracked by the command tracker 140. In embodiments of the present disclosure, the write abort scheme is driven from the read queue 130. More specifically, in each channel controller 116, the read queue 130 issues an Abort command to the memory command selector 136 of the command selector 135 to terminate a write operation in progress in the same memory bank as a pending read request. In operation, the read queue 130 has a pending read request to a destination address associated with a certain memory bank (or memory tile) of a certain memory die and the read queue 130 determines from the bank tracker 145 that the memory bank currently has a write operation in progress but is eligible for abort. The eligible for abort bank status is determined based on the progress or the stage of the write operation, as will be explained in more detail below. When the read queue determines that the write operation is eligible for abort, the read queue issues the Abort command to the memory command selector 136 to bid for access to terminate the write operation at that particular memory bank. Once the write operation is terminated, the command tracker 140 updates the status of the memory bank as being inactive and the read queue 130 can then issue the Activate command for the pending read request since the memory bank is now free and the pending read request to the same memory bank becomes eligible for execution. The read queue 130 issues the Activate command to the memory command selector 136 to bid for access to the memory device. In this manner, a write operation in progress is terminated to allow a read operation to the same memory bank to proceed.

Meanwhile, the command tracker 140 updates the status of the terminated write operation, such as the write operation having been partially executed only. The write queue 132 is informed of the status of the write operations at each memory bank from the command tracker 140. In the present embodiment, write requests that are winning commands and have issued to the memory device is stored in the issued write queue 133. In that case, the issued write queue 133 monitors the status of the issued write operations at the command tracker 140 to determine if an issued write operation has been terminated, that is, if an issued write operation has been partially executed only.

When the memory bank is free (or inactive) again, the issued write queue 133 will issue a Resume Write command to the command selector 135 to attempt to bid for access to resume the terminated write operation. In some embodiments, the memory device is configured to store the write data associated with a terminated write operation locally at the memory bank. For example, the write data may be stored in a data latch DL2 (FIG. 6) associated with the sense amplifier circuit. In that case, the Resume Write command is sent from the channel controller without the need to send the write data again. The memory device obtains the write data from the data latches in the support circuitry associated with each memory bank. In this configuration, the Resume Write command is sent to the memory command selector 136 of the command selector 135 because the command does not include the write data as the write data has already been sent to the memory device 101 and is stored locally at the designated memory bank (tile). In the present description, the Resume Write command refers collectively to a Resume Erase command and a Resume Program command to resume a terminated write operation at the suitable stage of the write operation, as will be described in more detail below.

In other embodiments, the write data storage 134 maintains the write data for each write request until completion, instead of storing the write data locally. Accordingly, when a Resume Write command is sent to the memory device (from either the write queue or the issued write queue), the Resume Write command is sent along with the write data on the data bus 148. In this case, the memory device does not have to maintain or store the write data for a terminated write operation and rely on the memory controller to provide the write data again. In this embodiment, the Resume Write command may be sent through the data command selector 138. In the following description, the channel controller architecture of FIG. 8 is used and the issued write queue 133 manages write requests that are already issued to the memory device and the issued write queue 133 is configured to send the Resume Write command in response to the memory bank status indicating the memory bank is now free.

The write abort scheme implemented in the memory controller will now be described in more details with reference to FIGS. 9-16.

In embodiments of the present disclosure, each write operation to a memory page includes an erase phase where some of the storage transistors are put in the erased state (e.g., logical "1") and a program phase where other storage transistors are put in the programmed state (e.g., logical "0"), based on the write data. Furthermore, in embodiments of the present disclosure, the write operation is performed together with a partial refresh operation where each time a memory page is to be written, another memory page associated with the same word line is selected to be refreshed at the same time. As described above, a destination memory address actives a selected word line which activates P number of memory pages. While one of the P memory pages is selected for the write operation, the partial refresh operation selects another memory page belonging to the activated word line for refresh. The partial refresh operation can be advantageously applied to reduce disturb that may be experienced by the non-selected storage transistors associated with the activated word line. The partial refresh operation is described in copending and commonly assigned U.S. patent application Ser. No. 17/525,712, entitled "Methods For Reducing Disturb Errors By Refreshing Data Alongside Programming Or Erase Operations," by Raul Adrian Cernea, filed Nov. 12, 2021, which application is incorporated by reference in its entirety. When the partial refresh operation is implemented, each write operation further includes a sensing or read phase prior to the erase or program phase to read out the stored data from the memory page to be refreshed. The memory page to be refreshed may be indicated by a refresh pointer. In the following description, the write abort scheme is described with reference to a write operation that implements the partial refresh operation and thus includes a sensing phase, followed by an erase phase and a program phase. It is instructive to note that the write abort scheme of the present disclosure can be applied to a write operation that does not implement the partial refresh operation. Whether the write operation implements the partial refresh operation is not critical to the practice of the write abort scheme.

In embodiments of the present disclosure, the write operation with partial refresh operation reads the stored data from a memory page ("refresh memory page") associated with the same word line as the memory page to be written ("write memory page"). The read out data of the refresh memory page, referred herein as "refresh data," is stored locally on the memory device to be used to refresh the storage transistors in the refresh memory page. In some embodiments, the refresh data is stored in data latches coupled to the sense amplifiers at the support circuit of each memory bank. Referring to FIG. 6, in one embodiment, the refresh data being read from the refresh memory page is stored in the data latch 84 (DL1). Data latch DL1 implements a local data storage at the memory bank. Meanwhile, the data latch 86 (DL2) is used to store incoming write data from a write operation or outgoing read data for a read operation. In the case a third data latch is available in support circuit of each memory bank, for example, the sense amplifier itself may serve as the third data latch, the data latch 86 (DL2) is used to store incoming write data and the third data latch is used to store outgoing read data.

As thus configured, the refresh data is read out from the refresh memory page and stored locally in data latch DL1 and the refresh data is written back to the refresh memory page concurrently with a write operation being performed to the write memory page using write data that is stored in the data latch DL2. In particular, during the concurrent partial refresh and write operation, the refresh data is read out from the refresh memory page during the sensing phase and stored locally, some of the storage transistors in the refresh and write memory pages will be erased during the erase phase and other storage transistors in the refresh and write memory pages will be programmed during the program phase, as a function of the write data and refresh data.

Figure 9:
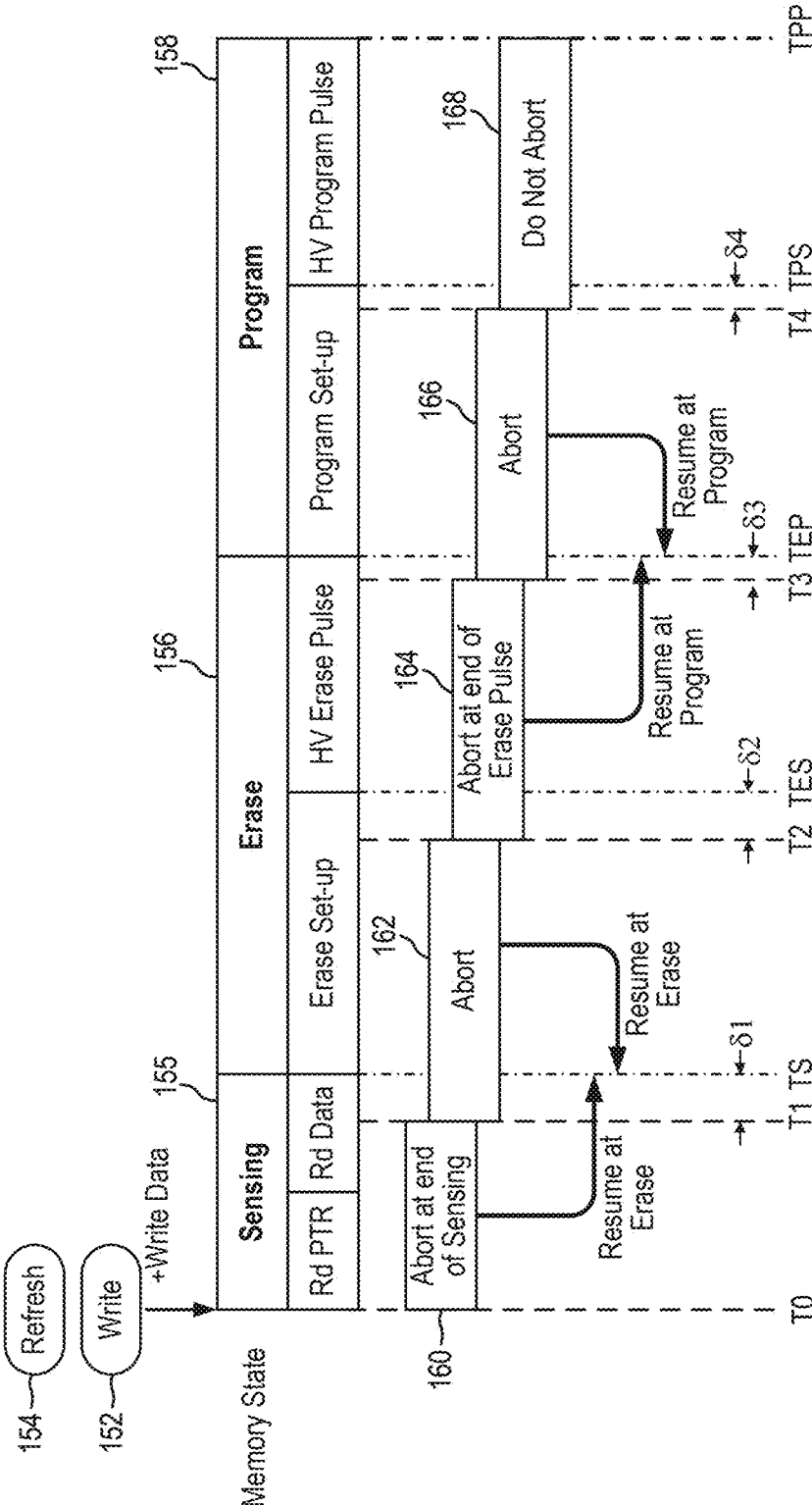
FIG. 9 illustrates the write abort scheme which can be implemented in the memory module in embodiments of the present disclosure.

FIG. 9 illustrates the write abort scheme which can be implemented in the memory module in embodiments of the present disclosure. In the present embodiment, the write abort scheme is described with reference to a write operation that implements the partial refresh operation. Referring to FIG. 9, the write operation or the write flow performed at the memory device includes the sensing phase 155, followed by the erase phase 156, and followed by the program phase 158. The sensing phase 155 includes two read operations: a first read operation to read the refresh pointer and a second read operation to read the refresh data at the refresh memory page indicated by the refresh pointer. The refresh pointer is incremented each time a refresh memory page is written back so that the next memory page is selected for refresh in the next write operation. The erase phase 156 includes two stages: an erase set-up stage where the bit lines and the words lines are biased to intermediate voltage levels and an erase pulse stage where a high-voltage erase pulse is applied to the selected bit line (for charge-trapping type storage transistor) or to the selected word line (for ferroelectric storage transistor) to erase the selected storage transistors. A high-voltage pulse at a lower voltage level may also be applied to the unselected bit line and unselected word line to inhibit disturb of unselected storage transistors. The program phase 158 includes two stages: a program set-up stage where the bit lines and the words lines are biased to intermediate voltage levels and a program pulse stage where a high-voltage program pulse is applied to the selected word line (for charge-trapping type storage transistors) or to the selected bit line (for ferroelectric storage transistor) to program the selected storage transistors. In the present description, the erase set-up stage and the program set-up stage are sometimes referred to as respective set-up stage or set-up phase; and the erase pulse stage and the program pulse stage are sometimes referred to as respective voltage pulse stage or phase.

The memory device, in response to receiving a write command 152 with write data from the channel controller, initiates the write operation or write flow at a memory page associated with a selected word line in a memory bank of a memory die specified by the destination memory address indicated in the write command. Alternately, the memory device may receive e a refresh command 154, in which case the memory device reads the refresh pointer to identify the refresh memory page and read the stored data at the refresh memory page. The refresh operation proceeds as a write operation to the erase phase and the program phase to write back the refresh data to the refresh memory page. In the following description, the write abort scheme is sometimes described with respect to a write operation but it is understood that the write abort scheme applies similarly to a refresh operation as well.

In one example, the channel controller is operated under a controller clock running at 500 MHz and 2 ns clock cycle. The sensing phase 155 may have a duration of 200 ns, with the first read operation and the second read operation each having a duration of 100 ns. The erase phase 156 may have a duration of 400 ns, with the erase set-up stage having a duration of 260 ns and the erase pulse stage having a duration of 140 ns. The program phase 158 may have a duration of 400 ns, with the program set-up stage having a duration of 210 ns and the program pulse stage having a duration of 190 ns.

In embodiments of the present disclosure, a write abort scheme is implemented to enable the channel controller to issue the Abort command to terminate a write operation in progress to allow a read operation to the same memory bank to proceed. As described above, the Abort command is issued by the read queue of the channel controller in response to the read queue determining that the memory bank associated with a pending read request has a write operation in progress but the memory bank has a bank status indicating the memory bank is eligible for abort.

In the present description, each command issued by a channel controller to the memory device includes a destination memory address that selects the memory die within the memory channel, the memory bank within the memory die, the word line within the memory bank, and the memory page associated with the selected word line. In the present description, references to the "same memory bank" refers to the same memory tile on the same memory die in the same memory channel. The write abort scheme is implemented in each channel controller of the memory controller. Therefore, in the following description, it is understood that the memory operation are designated for the memory channel associated with the channel controller and each command issued to the memory channel of the memory device specifies the memory die, the memory bank (or tile), the word line, and the memory page to be accessed.

In embodiments of the present disclosure, the write abort scheme implements different termination behavior depending on the phases/stages of the write operation in progress at the memory device so as to realize optimized memory performance in the event a write operation is to be terminated. In some embodiments, the write abort scheme implements two types of write abort operation: (1) a no-latency abort where in response to the Abort command, the write operation in progress is terminated at the end of the current phase in the write flow and the read operation can commence without additional abort latency; and (2) a regular abort where in response to the Abort command, the write operation in progress is terminated, usually in the middle of a set-up stage of either the erase or program phase, and the read operation can commence after an abort latency duration has expired. In one example, the abort latency is 100 ns.

Referring to FIG. 9, the write command 152 is assumed to have issued at a time T0 to a memory die DE[p], a memory bank BA[x], a word line RA[a] and a memory page PA[m]. The write command 152 is accompanied by the write data provided on the data bus. In the case of a refresh operation, the refresh command 154 is issued to a memory die DE[p], a memory bank BA[x], and a word line RA[a]. No write data is provided with the refresh command and the refresh operation determines the memory page to be refreshed by reading the refresh pointer during the sensing phase. The following description will refer to the write operation but it is understood that the write abort scheme applies to the refresh operation in similar manner. It is assumed that the channel controller, or the read queue in the channel controller, has a pending read request to the same memory die (DE[p]) and the same memory bank (BA[x]). The pending read request can further designate the same or different word line as RA[a] within the memory bank for read access, and in the case the pending read request specifies the same word line RA[a], the read request designates a different memory page PA[m] for read access. In this situation, the channel controller, through the read queue for example, issues an Abort command to attempt to terminate the write operation in progress at the memory bank BA[x]. It is instructive to note that the channel controller issues the Abort command only when the bank status for memory bank BA[x] indicates the memory bank is eligible for abort. The Abort command is not issued when the bank status for memory bank BA[x] indicates the memory bank is not eligible for abort.

It is instructive to note that incoming read request to the same memory bank, same word line and same memory page can be satisfied by the write data stored in the write staging buffer 128 or the write data storage 134 (FIG. 8) and therefore no Abort operation is needed in this particular situation.

In response to the Abort command being issued between time T0 and a time T1 (denoted by reference numeral 160), where time T1 is a given time duration ("δ1") before the end of the sensing phase 155 at time TS, the channel controller determines that the write operation is in the sensing phase 155. For example, the read queue 130 determines the status of the write operation at the memory bank BA[x] from the command tracker 140 in the channel controller. In this case, the abort operation will implement that no-latency type abort where the memory device proceeds to complete the sensing phase to obtain the refresh pointer and the refresh data associated with the refresh memory page and then the write operation is terminated. In other words, the write operation is terminated at the end of the sensing phase (time TS). At the completion of the sensing phase, the bank status of the memory bank BA[x] is updated at the bank tracker 145 to indicate that the memory bank is free, without any additional latency, and the read queue can bid for access to the memory bank BA[x] in order to initiate the read operation to the same memory bank. Meanwhile, the command tracker updates in the issued write queue the status of the write request associated with the terminated write operation. When the issued write queue resumes the terminated write operation, the issued write queue will issue a Resume Erase command to resume the terminated write operation at the erase phase 156. The Resume Erase command may be sent with the write data in the event the previously sent write data has not been stored locally in the memory device. Alternately, the memory device may have stored the previously sent write data locally, such as storing the write data in data latches associated with the sense amplifier circuit, so that the Resume Erase command can be sent without the write data. Note that the refresh data for the partial refresh operation is stored locally in the memory device, such as in separate data latches associated with the sense amplifier circuit in each memory bank.

In the present embodiment, the time duration δ1 before the end of the sensing phase 155 implements a guard band for the expiration of the sensing phase. In this manner, any Abort command arriving too close to the end of the sensing phase will be treated as arriving in the next phase to avoid ambiguities in the memory bank status. In one example, when the sensing phase is 200 ns, the guard band time duration δ1 is 40 ns.

In another scenario, in response to the Abort command being issued between time T1 and a time T2 (denoted by reference numeral 162), where time T2 is a given time duration ("δ2") before the end of the erase set-up stage at time TES, the channel controller determines that the write operation is in the erase set-up stage of the erase phase 156. With the write operation being terminated in the middle of the erase set-up stage, the abort operation will implement the regular abort where the memory device terminates the erase set-up stage and proceeds to clean up and discharges relevant signals applied to the bit lines and the word lines. To allow the memory device time to reset the bit line and word line voltages, the command tracker imposes an abort latency before the bank status of the memory bank BA[x] can be updated. In one embodiment, the abort latency is 100 ns. At the expiration of the abort latency, the command tracker 140 signals the bank tracker 145 to update the bank status for memory bank BA[x] to indicate the memory bank is free. The read queue can bid for access to the memory bank BA[x] in order to initiate the read operation to the same memory bank. Meanwhile, the command tracker updates in the write queue the status of the write request associated with the terminated write operation. When the issued write queue resumes the terminated write operation, the issued write queue will issue a Resume Erase command to resume the terminated write operation at the start of the erase phase 156. The Resume Erase command may be sent with the write data or may be sent without the write data in the case the previously sent write data has been stored locally in the memory device. In the present embodiment, the time duration δ2 implements a guard band for the expiration of the erase set-up stage. Any Abort command arriving too close to the end of the erase set-up stage will be treated as arriving in the next stage to avoid ambiguities in the memory bank status. In one example, when the erase set-up phase is 260 ns, the guard band time duration δ2 is 40 ns.

In yet another scenario, in response to the Abort command being issued between time T2 and a time T3 (denoted by reference numeral 164), where time T3 is a given time duration ("δ3") before the end of the erase pulse stage at time TEP, the channel controller determines that the write operation is in the voltage pulse stage of the erase phase 156. In this case, the abort operation will implement that no-latency type abort where the memory device proceeds to complete the voltage pulse stage and then the write operation is terminated. In other words, the write operation is terminated at the end of the erase phase. When the Abort command arrives during the erase pulse stage where the high voltage erase pulse is being applied, it is more efficient for the memory device to complete the erase phase rather than terminating the erase pulse stage and having to discharge the high voltage signals on the bit lines or word lines. Accordingly, any Abort command that arrives between time T2 and T3 will terminate the write operation only at the end of the erase phase.

At the completion of the erase phase, the bank status of the memory bank BA[x] is updated at the bank tracker 145 to indicate that the memory bank is free, without any additional latency, and the read queue can bid for access to the memory bank BA[x] in order to initiate the read operation to the same memory bank. Meanwhile, the command tracker updates in the write queue the status of the write request associated with the terminated write operation. When the issued write queue resumes the terminated write operation, the issued write queue will issue a Resume Program command to resume the terminated write operation at the program phase 158. The Resume Program command may be sent with the write data or may be sent without the write data in the case the previously sent write data has been stored locally in the memory device. In the present embodiment, the time duration δ3 implements a guard band for the expiration of the erase pulse stage. Any Abort command arriving too close to the end of the erase pulse stage will be treated as arriving in the next phase to avoid ambiguities in the memory bank status. In one example, when the erase pulse stage is 140 ns, the guard band time duration δ3 is 20 ns.

In the next scenario, in response to the Abort command being issued between time T3 and a time T4 (denoted by reference numeral 166), where time T4 is a given time duration ("δ4") before the end of the program set-up stage at time TPS, the channel controller determines that the write operation is in the program set-up stage of the program phase 158. With the write operation being terminated in the middle of the program set-up stage, the abort operation will implement the regular abort where the memory device terminates the program set-up stage and proceeds to clean up and discharges relevant signals applied to the bit lines and the word lines. To allow the memory device time to reset the bit line and word line voltages, the command tracker imposes the abort latency before the bank status of the memory bank BA[x] can be updated. At the expiration of the abort latency, the command tracker 140 signals the bank tracker 145 to update the bank status for memory bank BA[x] to indicate the memory bank is free. The read queue can bid for access to the memory bank BA[x] in order to initiate the read operation to the same memory bank. Meanwhile, the command tracker updates in the write queue the status of the write request associated with the terminated write operation. When the issued write queue resumes the terminated write operation, the issued write queue will issue a Resume Program command to resume the terminated write operation at the start of the program phase 158. The Resume Program command may be sent with the write data or may be sent without the write data in the case the previously sent write data has been stored locally in the memory device. In the present embodiment, the time duration δ4 implements a guard band for the expiration of the erase set-up stage. Any Abort command arriving too close to the end of the program set-up stage will be treated as arriving in the next stage to avoid ambiguities in the memory bank status. In one example, when the program set-up phase is 210 ns, the guard band time duration δ4 is 20 ns.

Finally, in some cases, the write operation has progressed to the voltage pulse stage of the program phase where the high voltage program pulse is being applied to the selected word line. After time T4 and before time TPP (denoted by reference numeral 168), where time TPP indicates the end of the write operation (such as 1 μs), there is no benefits to terminate the write operation as the write operation is near completion. In that case, the command tracker 140 updates the bank status for memory bank BA[x] to busy, indicating the memory bank is not eligible for abort. The channel controller determines from the bank status of the memory bank BA[x] that write abort is not possible for the memory bank and no Abort command will be issued. Instead, the program pulse phase will proceed to completion to finish the write operation at memory bank BA[x]. At the completion of the program phase, the bank status of the memory bank BA[x] is updated at the bank tracker 145 to indicate that the memory bank is now free and the read queue can bid for access to the memory bank BA[x] in order to initiate the read operation to the same memory bank.

By applying different type of write abort operation depending on the stage of the write operation in progress, the channel controller can implement a write abort scheme that is efficient and that enhances the memory device performance. In some embodiments, the terminated write operation has to be completed before the write queue can issue another write command to the same memory bank. In another embodiment, a write operation in progress may be terminated multiple times to allow pending read requests to the same memory bank to proceed first. In some cases, a maximum allowable number of write abort may be set to limit the number of times a write operation can be aborted. In another embodiment, no maximum allowable number of write abort is used. In practice, the memory controller manages distribution of incoming requests to different memory channels and different memory banks in each memory channel such that in most cases, a write operation may be aborted only a few times over the course of the memory device operation.

Exemplary operations of the write abort scheme in various stages of the write operation will be illustrated below with reference to FIGS. 10-15.

Figure 10:
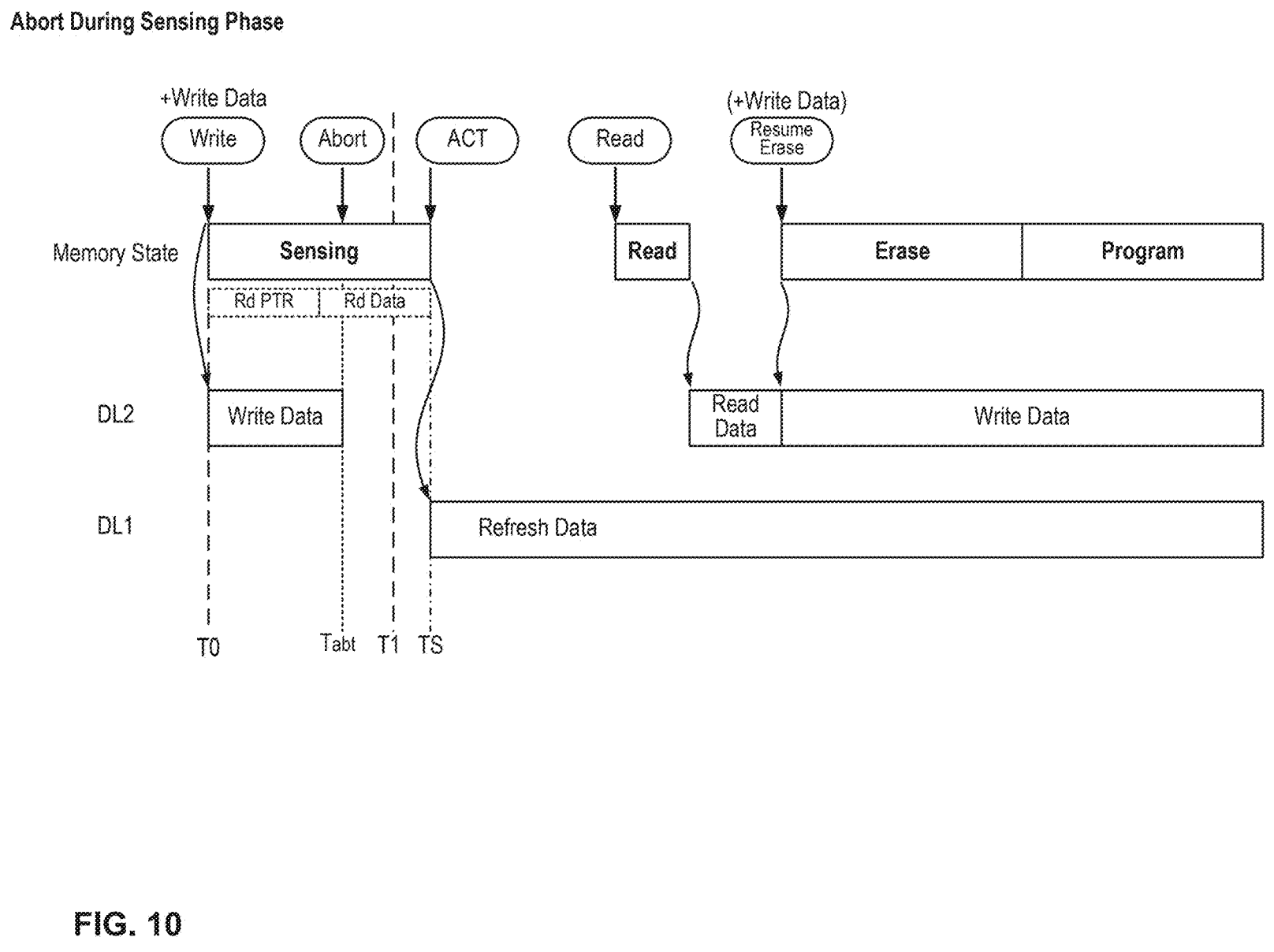

FIG. 10 illustrates the write abort operation during the sensing phase of the write operation in one example. Referring to FIG. 10, at time T0, the channel controller issues a write command with write data to a memory bank BA[x], a word line RA[a] and a memory page PA[m]. In the present example, the write data is stored in the data latch DL2 associated with the sense amplifier circuit of the memory bank BA[x]. The write operation begins in the sensing phase to read out the refresh pointer indicating the refresh memory page and the refresh data associated with the refresh memory page. At time Tabt, the channel controller issues an Abort command. The Abort command is issued before time T1 and therefore the memory device will complete the sensing phase. The sensing phase reads out the refresh data which is stored locally in the memory device, such as in the data latch DL1 associated with the sense amplifier circuit of the memory bank BA[x].

At the end of the sensing phase (time TS), the write operation is terminated and the bank status for memory bank BA[x] is updated to free so that the read queue can bid for access to the memory bank BA[x]. When selected as the winning command, the channel controller issues an Activate command (ACT) to the memory bank BA[x], which also specify a word line RA[b] and a memory page PA[n]. The Activate command can be issued as soon as the sensing phase is completed, without additional latency. The Activate command causes the memory device to sense the stored data at the memory page PA[n] of word line RA[b]. Subsequently, the channel controller issues the Read command to cause the memory device to latch the read data into the data latch DL2. The latched read data can then be read out using the data bus to the channel controller, in the manner as described above. In the present example, the read data and the write data use the same data latch and therefore the read operation will overwrite the write data of the terminated write operation. In other embodiments, additional data latches may be used to store the read data. For example, the sense amplifier itself may implement data latching function and serves as a third data latch DL3 to store the read data. In that case, the data latch DL2 may retain the write data from the terminated write operation.

After the read command has completed, the write queue may then bid for access to resume the terminated write operation. In this case, the channel controller issues the Resume Erase command to memory bank BA[x]. The Resume Erase command may be sent with the write data or the memory device may use the locally stored write data in the data latch DL2. Meanwhile, the refresh data remains in the data latch DL1. The write operation can continue with the erase phase followed by the program phase, using the write data and refresh data from data latch DL2 and data latch DL1.

Figure 11:
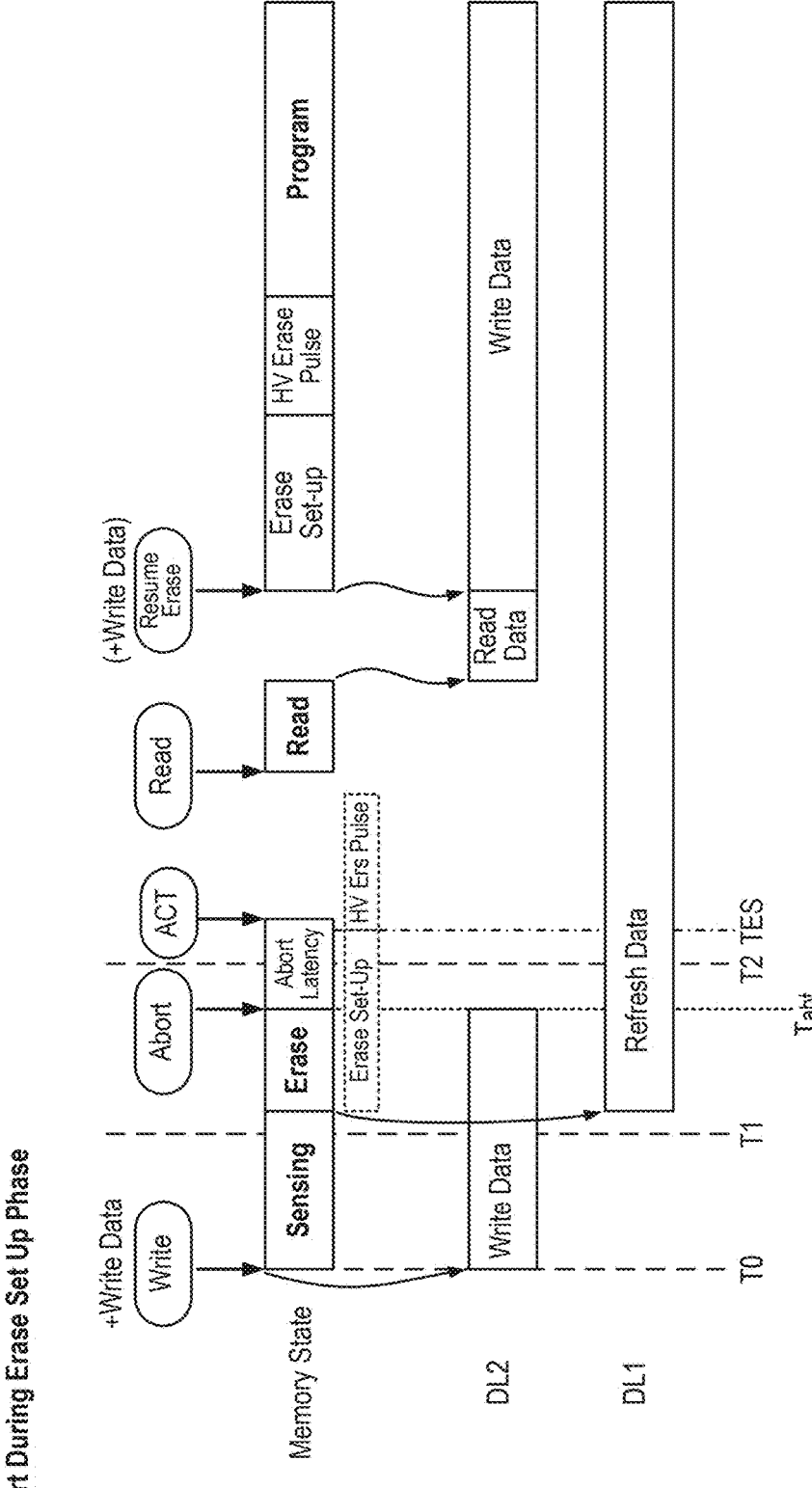
FIG. 11 illustrates the write abort operation during the erase set-up stage of the erase phase of the write operation in one example.

FIG. 11 illustrates the write abort operation during the erase set-up stage of the erase phase of the write operation in one example. Referring to FIG. 11, at time TO, the channel controller issues a write command with write data to a memory bank BA[x], a word line RA[a] and a memory page PA[m]. In the present example, the write data is stored in the data latch DL2 associated with the sense amplifier circuit of the memory bank BA[x]. The write operation begins in the sensing phase to read out the refresh pointer indicating the refresh memory page and the refresh data associated with the refresh memory page. At time TS, the sensing phase is completed and the refresh data is obtained and stored in the data latch DL1. The write operation proceeds to the erase set-up stage of the erase phase.

At time Tabt, the channel controller issues an Abort command. The Abort command is issued before time T2 and therefore the memory device will terminate the erase set-up stage. The memory device cleans up and discharge the voltages on the word lines and bit lines. The command tracker 140 imposes the abort latency duration after the Tabt time (e.g. 100 ns). After the abort latency, the bank status for memory bank BA[x] is updated to free so that the read queue can bid for access to the memory bank BA[x]. When selected as the winning command, the channel controller issues an Activate command (ACT) to the memory bank BA[x]. The Activate command can be issued only after the abort latency duration has expired. The Activate command causes the memory device to sense the stored data at the memory page PA[n]. Subsequently, the channel controller issues the Read command to cause the memory device to latch the read data into a read data latch, such as data latch DL2 or a third data latch within the sense amplifier. The latched read data can then be read out using the data bus to the channel controller.

After the read command has completed, the write queue may then bid for access to resume the terminated write operation. In this case, the channel controller issues the Resume Erase command to memory bank BA[x]. The Resume Erase command may be sent with the write data or the memory device may use the locally stored write data in the data latch DL2. Meanwhile, the refresh data remains in the data latch DL1. The write operation resumes at the start of the erase set-up stage and continues with the erase pulse stage followed by the program phase, using the write data and refresh data from data latch DL2 and data latch DL1.

Figure 12:
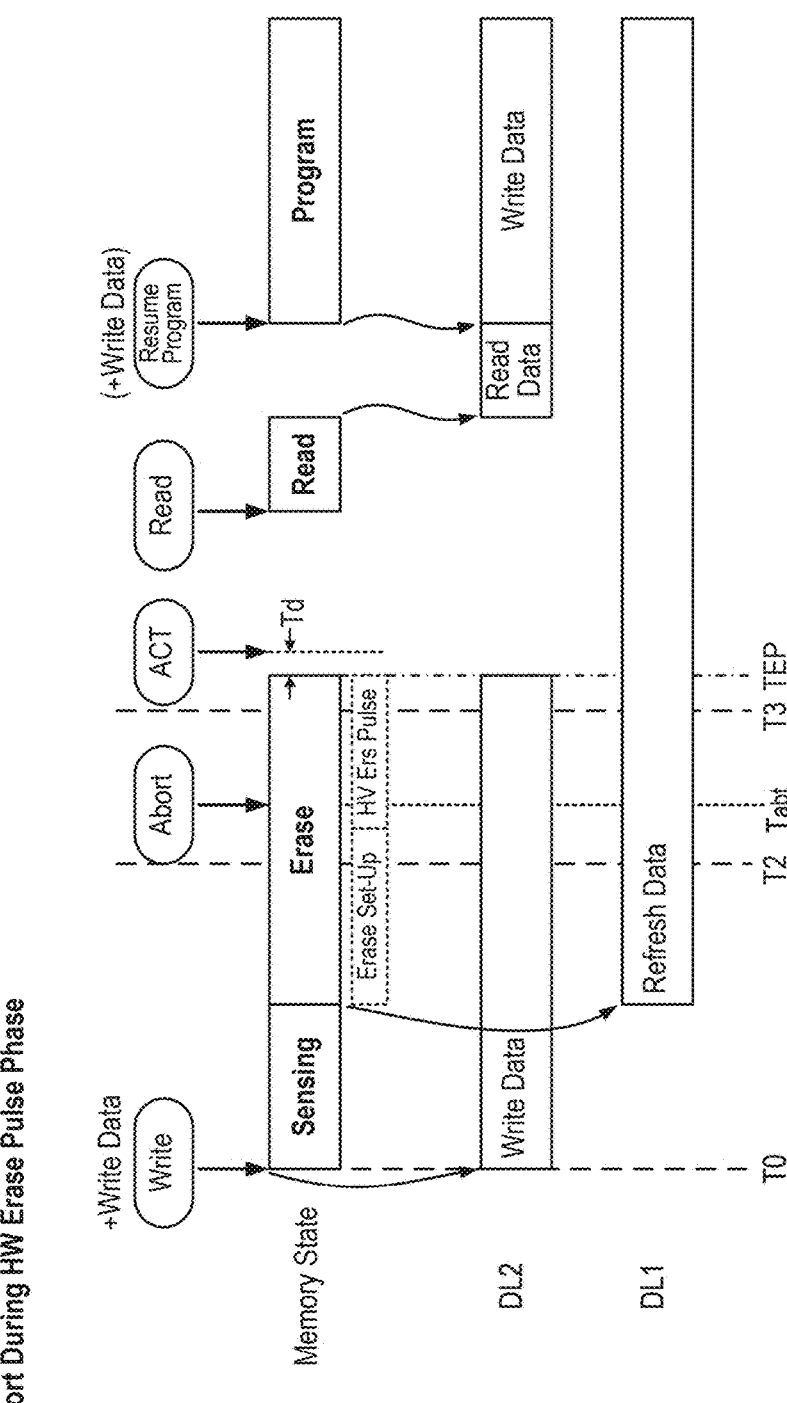
FIG. 12 illustrates the write abort operation during the erase pulse stage of the erase phase of the write operation in one example.

FIG. 12 illustrates the write abort operation during the erase pulse stage of the erase phase of the write operation in one example. Referring to FIG. 12, at time TO, the channel controller issues a write command with write data to a memory bank BA[x], a word line RA[a] and a memory page PA[m]. In the present example, the write data is stored in the data latch DL2 associated with the sense amplifier circuit of the memory bank BA[x]. The write operation begins in the sensing phase to read out the refresh pointer indicating the refresh memory page and the refresh data associated with the refresh memory page. At time TS, the sensing phase is completed and the refresh data is obtained and stored in the data latch DL1. The write operation proceeds to the erase set-up stage of the erase phase followed by the erase pulse stage.

At time Tabt, the channel controller issues an Abort command. The Abort command is issued before time T3 and therefore the memory device will complete the erase pulse stage of the erase phase. That is, the memory device will complete writing storage transistors to the erased state based on the write data and the refresh data stored in data latch DL2 and data latch DL1.

At the end of the erase phase (time TEP), the write operation is terminated and the bank status for memory bank BA[x] is updated to free so that the read queue can bid for access to the memory bank BA[x]. When selected as the winning command, the channel controller issues an Activate command (ACT) to the memory bank BA[x], which also specify a word line RA[b] and a memory page PA[n]. The Activate command can be issued as soon as the erase phase is completed. In some embodiments, a small time delay Td may be applied to the end of the erase phase before the Activate command can be sent. In one example, the time delay Td is 25 ns.

The Activate command causes the memory device to sense the stored data at the memory page PA[n]. Subsequently, the channel controller issues the Read command to cause the memory device to latch the read data into a read data latch, such as data latch DL2 or a third data latch within the sense amplifier. The latched read data can then be read out using the data bus to the channel controller. After the read command has completed, the write queue may then bid for access to resume the terminated write operation. In this case, the channel controller issues the Resume Program command to memory bank BA[x]. The Resume Program command may be sent with the write data or the memory device may use the locally stored write data in the data latch DL2. Meanwhile, the refresh data remains in the data latch DL1. The write operation can continue with the program phase, using the write data and refresh data from data latch DL2 and data latch DL1.

Figure 13:
FIG. 13 illustrates the write abort operation during the program set-up stage of the program phase of the write operation in one example.
Figure 13:
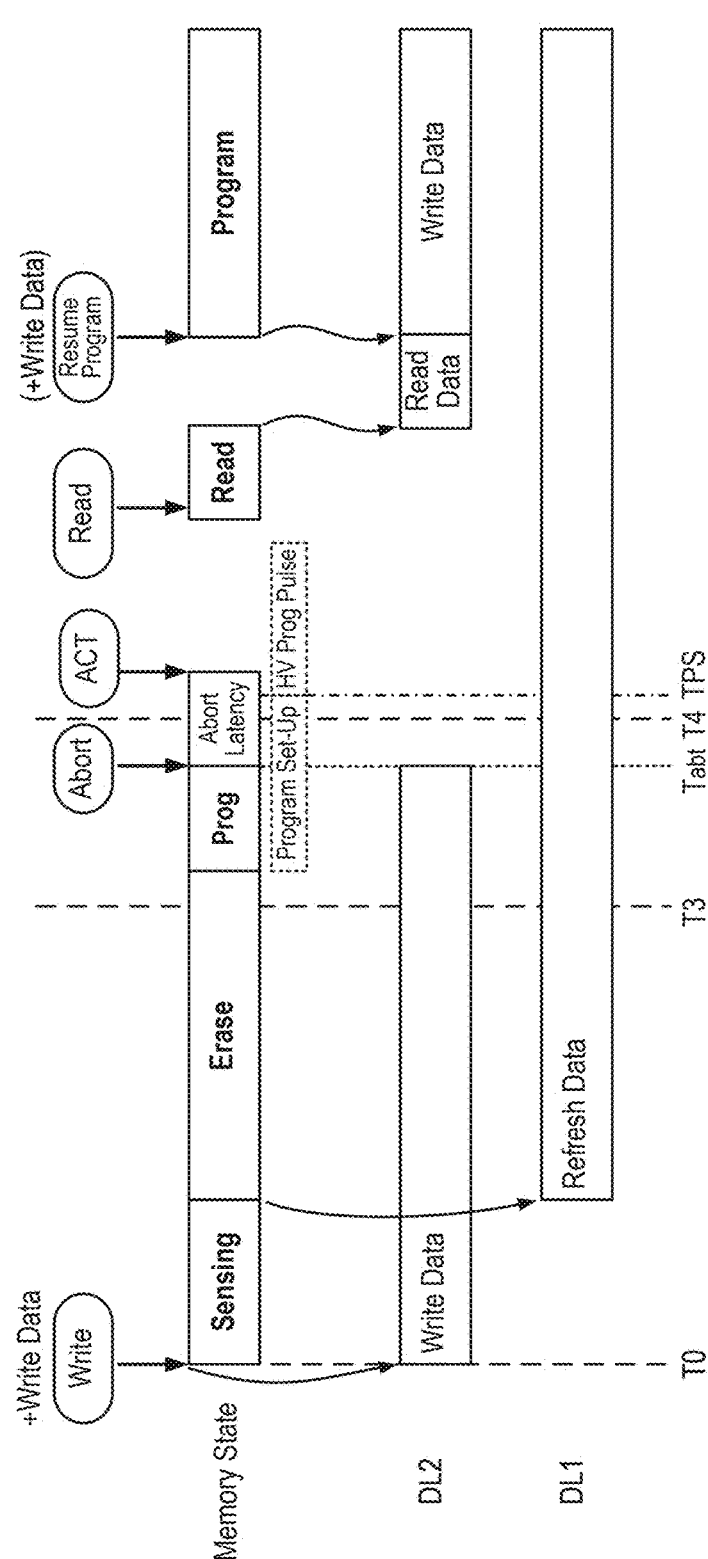

FIG. 13 illustrates the write abort operation during the program set-up stage of the program phase of the write operation in one example. Referring to FIG. 13, at time TO, the channel controller issues a write command with write data to a memory bank BA[x], a word line RA[a] and a memory page PA[m]. In the present example, the write data is stored in the data latch DL2 associated with the sense amplifier circuit of the memory bank BA[x]. The write operation begins in the sensing phase to read out the refresh pointer indicating the refresh memory page and the refresh data associated with the refresh memory page. At time TS, the sensing phase is completed and the refresh data is obtained and stored in the data latch DL1. The write operation proceeds to the erase phase to set storage transistors in the memory page PA[m] to the erased state using the write data and refresh data from data latch DL2 and data latch DL1. The write operation then proceeds to the program set-up stage of the program phase.

At time Tabt, the channel controller issues an Abort command. The Abort command is issued before time T4 and therefore the memory device will terminate the program set-up stage. The memory device cleans up and discharge the voltages on the word lines and bit lines. The command tracker 140 imposes the abort latency duration after the Tabt time (e.g. 100 ns). After the abort latency, the bank status for memory bank BA[x] is updated to free so that the read queue can bid for access to the memory bank BA[x]. When selected as the winning command, the channel controller issues an Activate command (ACT) to the memory bank BA[x]. The Activate command causes the memory device to sense the stored data at the memory page PA[n]. Subsequently, the channel controller issues the Read command to cause the memory device to latch the read data into a read data latch, such as data latch DL2 or a third data latch within the sense amplifier. The latched read data can then be read out using the data bus to the channel controller.

After the read command has completed, the write queue may then bid for access to resume the terminated write operation. In this case, the channel controller issues the Resume Program command to memory bank BA[x]. The Resume Program command may be sent with the write data or the memory device may use the locally stored write data in the data latch DL2. The write operation resumes at the start of the program set-up stage and continues with the program pulse stage, using the write data and refresh data from data latch DL2 and data latch DL1.

Figure 14:
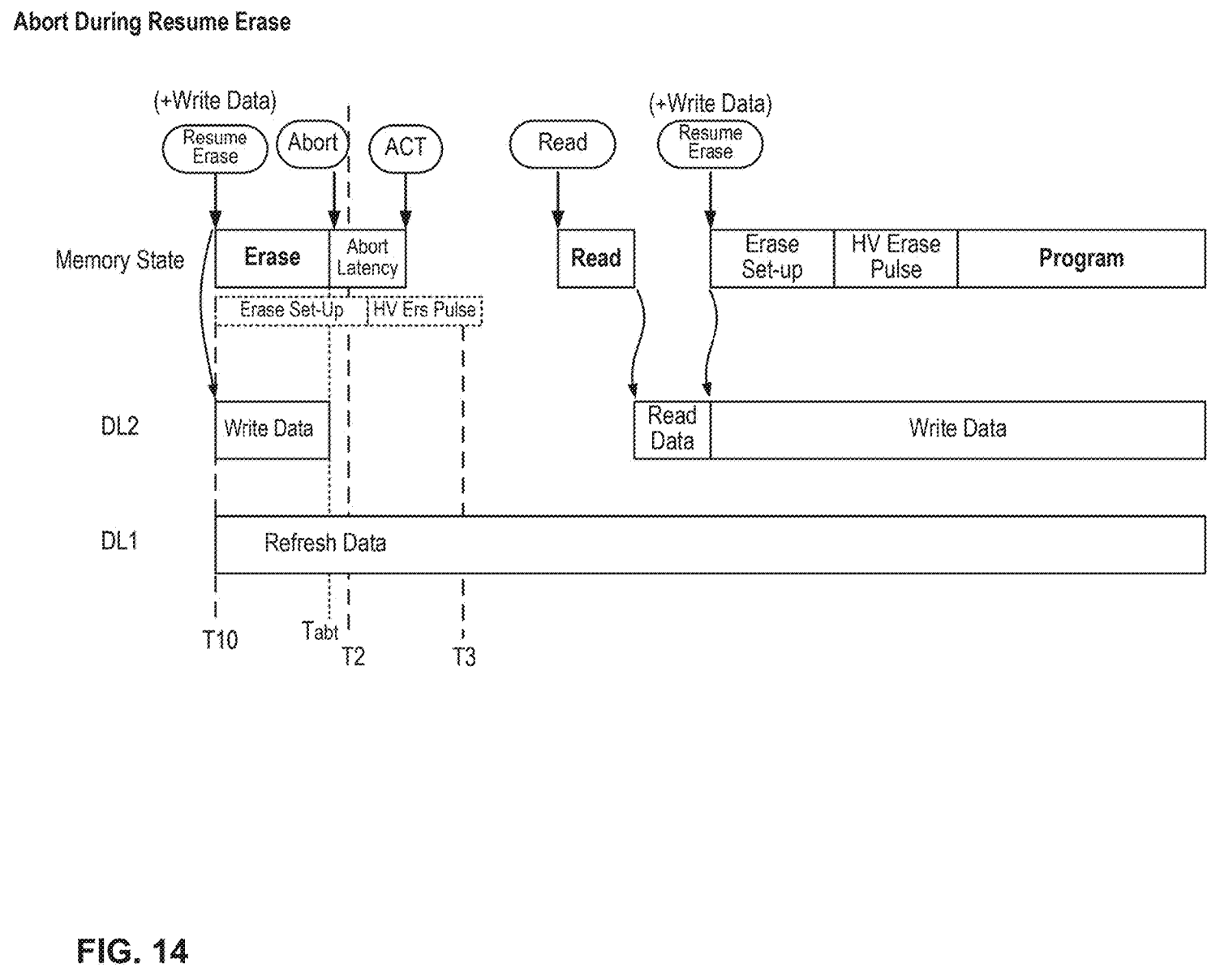

FIG. 14 illustrates the write abort operation during a resume erase operation in one example. Referring to FIG. 14, at time T10, the channel controller issues a Resume Erase command to resume a terminated write operation to the memory bank BA[x]. The write data may be sent with the Resume Erase command or may be stored locally from the previously sent write data. In the present example, the write data is stored in the data latch DL2 associated with the sense amplifier circuit of the memory bank BA[x]. The refresh data that was previously sensed remains stored in data latch DL1. The write operation begins in the erase phase. During the erase set-up stage, the memory device biases the bit lines and word lines to intermediate voltages.

At time Tabt, the channel controller issues an Abort command. The Abort command is issued before time T2 which is the guard-banded time before the end of the erase set-up stage. Therefore the memory device will terminate the erase set-up stage. The memory device cleans up and discharge the voltages on the word lines and bit lines. The command tracker 140 imposes the abort latency duration after the Tabt time. The abort and subsequent read operation proceed as described above with reference to FIG. 11. After the abort latency, the channel controller may issue an Activate command (ACT) to the memory bank BA[x]. The Activate command causes the memory device to sense the stored data at the memory page PA[n]. Subsequently, the channel controller issues the Read command to cause the memory device to latch the read data into a read data latch, such as data latch DL2 or a third data latch within the sense amplifier. The latched read data can then be read out using the data bus to the channel controller.

After the read command has completed, the write queue may then bid for access to resume the terminated write operation. In this case, the channel controller issues the Resume Erase command again to memory bank BA[x]. The write data may be provided or may remain stored in data latch DL2 in the memory device. Meanwhile, the refresh data remains in the data latch DL1. The write operation resumes at the start of the erase set-up stage and continues with the erase pulse stage followed by the program phase, using the write data and refresh data from data latch DL2 and data latch DL1.

In the case the Abort command arrives after time T2 but before time T3, the memory device will complete the erase pulse stage before terminating the write operation. In the case the Abort command is issued after time T3, the memory device will terminate the program set-up stage and the channel controller will wait for the abort latency before issuing the Activate command for the read operation. In both of these cases, the terminated write operation will resume by issuing the Resume Program command.

Figure 15:
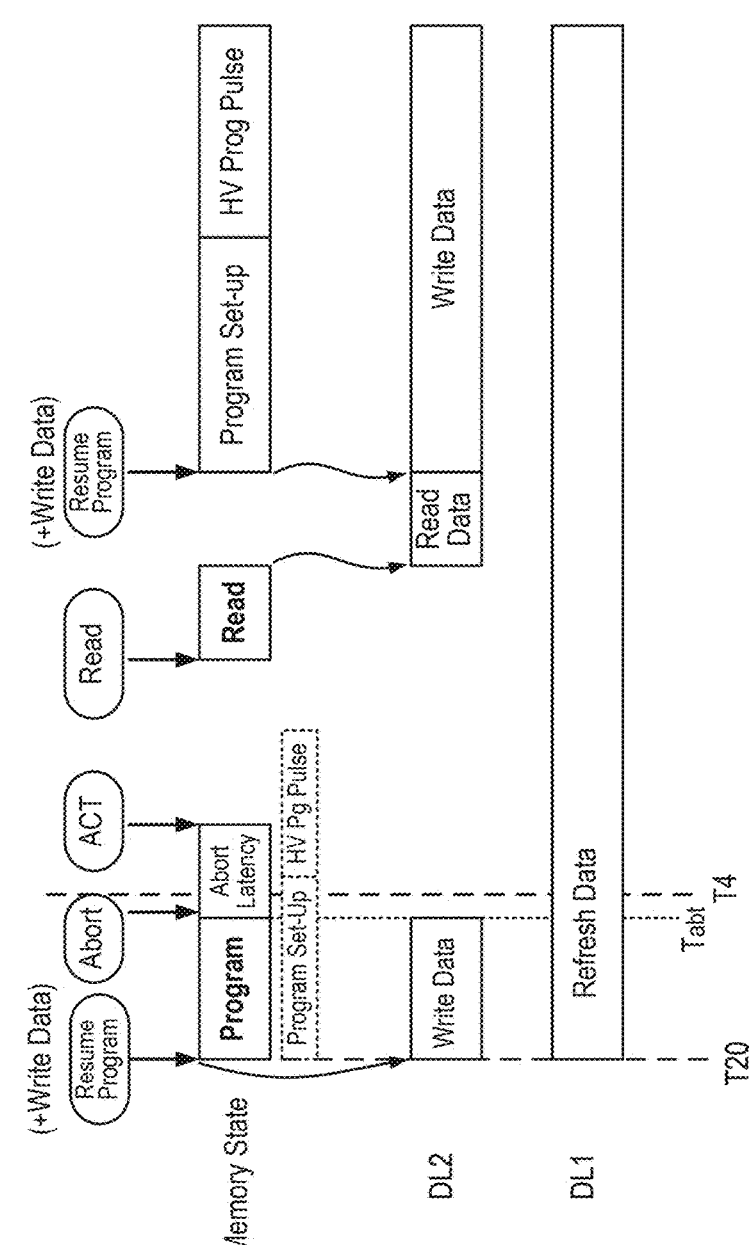
FIG. 15 illustrates the write abort operation during a resume program operation in one example.

FIG. 15 illustrates the write abort operation during a resume program operation in one example. Referring to FIG. 15, at time T20, the channel controller issues a Resume Program command to resume a terminated write operation to the memory bank BA[x]. The write data may be sent with the Resume Erase command or may be stored locally from the previously sent write data. In the present example, the write data is stored in the data latch DL2 associated with the sense amplifier circuit of the memory bank BA[x]. The refresh data that was previously sensed remains stored in data latch DL1. The write operation begins in the program phase. During the program set-up stage, the memory device biases the bit lines and word lines to intermediate voltages.

At time Tabt, the channel controller issues an Abort command. The Abort command is issued before time T4 which is the guard-banded time before the end of the program set-up stage. Therefore the memory device will terminate the program set-up stage. The memory device cleans up and discharge the voltages on the word lines and bit lines. The command tracker 140 imposes the abort latency duration after the Tabt time. The write abort and subsequent read operation proceed as described above with reference to FIG. 13. After the abort latency, the channel controller may issue an Activate command (ACT) to the memory bank BA[x]. The Activate command causes the memory device to sense the stored data at the memory page PA[n]. Subsequently, the channel controller issues the Read command to cause the memory device to latch the read data into a read data latch, such as data latch DL2 or a third data latch within the sense amplifier. The latched read data can then be read out using the data bus to the channel controller.

After the read command has completed, the write queue may then bid for access to resume the terminated write operation. In this case, the channel controller issues the Resume Program command to memory bank BA[x]. The write data may be provided or may remain stored in data latch DL2 in the memory device. Meanwhile, the refresh data remains in the data latch DL1. The write operation resumes at the start of the program set-up stage and continues with the program pulse stage, using the write data and refresh data from data latch DL2 and data latch DL1.

After time T4, the memory bank BA[x] is no longer eligible for abort. The memory device will complete the program pulse stage to finish the write operation. The channel controller may only bid for access to the memory bank BA[x] after the write operation is completed.

As described above, in some embodiments, the memory device support circuit may include additional data latches so that the read data and the write data do not have to share the same data latch at the sense amplifier circuit. In that case, the write data can be stored locally in the memory device at the memory bank of the terminated write operation. Subsequent Resume Erase or Resume Program commands can be sent without the write data as the memory bank can obtain the write data that is stored locally for the write operation.

Figure 16:
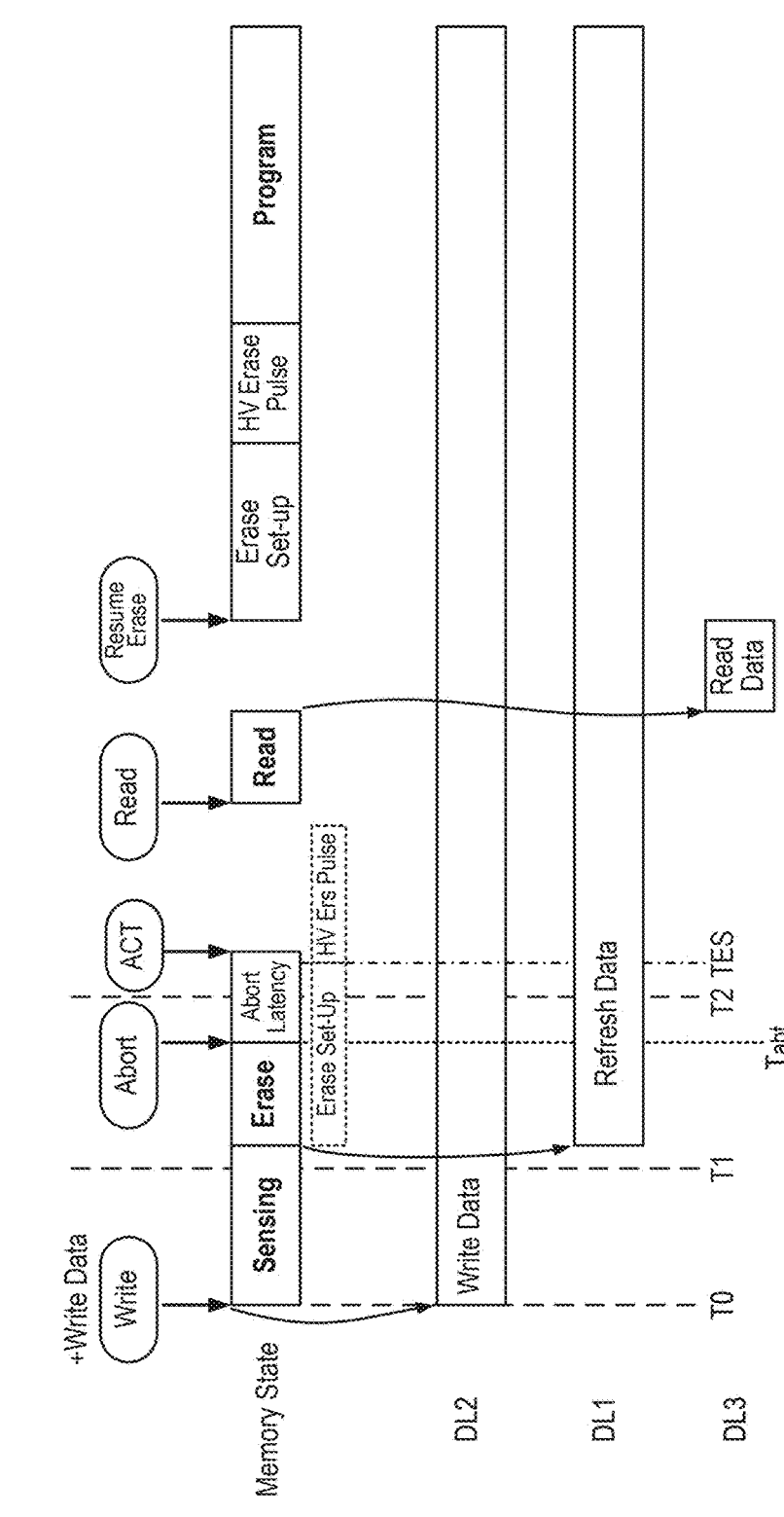
FIG. 16 illustrates the write abort operation during the erase set-up stage of the erase phase of the write operation in an alternate example.

FIG. 16 illustrates the write abort operation during the erase set-up stage of the erase phase of the write operation in an alternate example. Referring to FIG. 16, the memory device includes at each memory bank a data latch DL1 for storing refresh data, a data latch DL2 for storing write data and further includes a data latch DL3 for storing read data. In one embodiment, the data latch DL3 is representative only and the data latch DL3 may be a data latch function implemented in the sense amplifier circuit. That is, the data latch DL3 does not necessarily have to be a separate data latch circuit. In this case, at time TO, the channel controller issues a write command with write data to a memory bank BA[x] and the write data is stored in the data latch DL2. The write operation begins in the sensing phase to read out the refresh pointer indicating the refresh memory page and the refresh data associated with the refresh memory page. At time TS, the sensing phase is completed and the refresh data is obtained and stored in the data latch DL1. The write operation proceeds to the erase set-up stage of the erase phase.

As described above with reference to FIG. 11, the write operation may be terminated by the channel controller issuing an Abort command at time Tabt. The erase set-up stage of the erase phase is terminated. After the abort latency, the channel controller may issue an Activate command (ACT) to the memory bank BA[x]. The Activate command causes the memory device to sense the stored data at the memory page PA[n]. Subsequently, the channel controller issues the Read command to cause the memory device to latch the read data into the data latch DL3. The latched read data can then be read out using the data bus to the channel controller. Meanwhile, the write data and the refresh data remain in their respective data latches.

After the read command has completed, the write queue may then bid for access to resume the terminated write operation. In this case, the channel controller issues the Resume Erase command to memory bank BA[x]. No write data needs to be sent again. The write operation resumes at the start of the erase set-up stage and continues with the erase pulse stage followed by the program phase, using the write data and refresh data from data latch DL2 and data latch DL1. By providing a separate data latch for storing the read data and the write data, the Resume Erase or Resume Program Command can be issued without the write data. The channel controller does not need to maintain the write data after the write data was initially sent to the memory bank, which has the effect of reducing the amount of write data storage needed in the channel controller.

In this detailed description, process steps described for one embodiment may be used in a different embodiment, even if the process steps are not expressly described in the different embodiment. When reference is made herein to a method including two or more defined steps, the defined steps can be carried out in any order or simultaneously, except where the context dictates or specific instruction otherwise are provided herein. Further, unless the context dictates or express instructions otherwise are provided, the method can also include one or more other steps carried out before any of the defined steps, between two of the defined steps, or after all the defined steps In this detailed description, various embodiments or examples of the present invention may be implemented in numerous ways, including as a process; an apparatus; a system; and a composition of matter. A detailed description of one or more embodiments of the invention is provided above along with accompanying figures that illustrate the principles of the invention. The invention is described in connection with such embodiments, but the invention is not limited to any embodiment. Numerous modifications and variations within the scope of the present invention are possible. The scope of the invention is limited only by the claims and the invention encompasses numerous alternatives, modifications, and equivalents. Numerous specific details are set forth in the description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured. The present invention is defined by the appended claims.

The invention claimed is:

1. A memory system, comprising:
a memory device comprising an array of storage transistors for storing data, the storage transistors being organized in a plurality of memory banks, each memory bank comprising a plurality of memory pages; and
a controller device configured to interact with the memory device to perform read and write operations, each read or write operation being performed on a memory page in a memory bank,
wherein in response to a write operation being in progress at a first memory page in a first memory bank of the memory device and further in response to the controller device receiving a request for read data from a second memory page in the first memory bank of the memory device, the controller device issues a first command to the memory device to terminate the write operation in progress at the first memory page in the first memory bank of the memory device, and subsequent to terminating the write operation, the controller device issues a second command to the memory device to read data from the second memory page in the first memory bank of the memory device; and
wherein each of the write operations comprises an erase phase followed by a program phase, each of the erase phase and the program phase comprises a set-up stage and a voltage pulse stage, and wherein in response to a first write command being issued to the memory device at a given memory page of a given memory bank to initiate a second write operation, the controller device tracks the phase of the write operation being performed at the given memory page of the given memory bank of the memory device.

2. The memory system of claim 1, wherein subsequent to the read operation to the second memory page in the first memory bank being completed, the controller device issues a third command to the memory device to resume the write operation previously in progress at the first memory page in the first memory bank.

3. The memory system of claim 2, wherein the controller device issues the third command with associated write data to the memory device to resume the write operation previously in progress at the first memory page in the first memory bank.

4. The memory system of claim 2, wherein the controller device issues the third command without associated write data to the memory device to resume the write operation previously in progress at the first memory page in the first memory bank, the write operation using the write data stored in a data latch circuit associated with the first memory bank.

5. The memory system of claim 1, wherein in response to the controller device receiving the request for read data from the second memory page of the first memory bank of the memory device, the controller device issues the first command to the memory device to terminate the write operation in progress at the first memory page of the first memory bank of the memory device in response to determining that the write operation in progress is in the set-up stage of either the erase phase or the program phase or in the voltage pulse stage of the erase phase.

6. The memory system of claim 1, wherein in response to the controller device receiving the request for read data from the second memory page of the first memory bank of the memory device and in response to the controller device determining the write operation in progress at the first memory page of the first memory bank of the memory device is in the voltage pulse stage of the program phase, the controller device is prevented from issuing the first command to the memory device to terminate the write operation in progress.

7. The memory system of claim 5, wherein in response to the first command being issued during the set-up stage of the erase phase of the write operation in progress, the memory device terminates the write operation and the controller device issues the second command a first time duration after issuing the first command.

8. The memory system of claim 7, wherein subsequent to the read operation to the second memory page of the first memory bank being completed, the controller device issues the third command to the memory device to resume the write operation previously in progress at the first memory page of the first memory bank at the start of the set-up stage of the erase phase.

9. The memory system of claim 8, wherein the controller device determines the terminated write operation was in the set-up stage of the erase phase by determining the write operation is at least a second time duration before the end of the set-up stage of the erase phase.

10. The memory system of claim 5, wherein in response to the first command being issued during the voltage pulse stage of the erase phase of the write operation in progress, the memory device terminates the write operation after completion of the voltage pulse stage of the erase phase and the controller device issues the second command a third time duration after the write operation in progress completes the voltage pulse stage of the erase phase.

11. The memory system of claim 10, wherein subsequent to the read operation to the second memory page of the first memory bank being completed, the controller device issues the third command to the memory device to resume the write operation previously in progress at the first memory page of the first memory bank at the start of the set-up stage of the program phase.

12. The memory system of claim 10, wherein the controller device determines the write operation in progress is in the voltage pulse stage of the erase phase by determining the write operation is at least a fourth time duration before the end of the voltage pulse stage of the erase phase.

13. The memory system of claim 5, wherein in response to the first command being issued during the set-up stage of the program phase of the write operation in progress, the memory device terminates the write operation and the controller device issues the second command a first time duration after issuing the first command.

14. The memory system of claim 13, wherein subsequent to the read operation to the second memory page of the first memory bank being completed, the controller device issues the third command to the memory device to resume the write operation previously in progress at the first memory page of the first memory bank at the start of the set-up stage of the program phase.

15. The memory system of claim 13, wherein the controller device determines the write operation in progress is in the set-up stage of the program phase by determining the write operation is at least a fifth time duration before the end of the set-up stage of the program phase.

16. The memory system of claim 1, wherein the memory device stores the write data of the write operation to the first memory page in the first memory bank in a first data latch associated with the first memory bank; and wherein the write operation further comprises a sensing phase before the erase phase, the sensing phase being performed to read data stored in a third memory page of the first memory bank, the memory device storing the read data associated with the third memory page in a second data latch; and wherein the write operation at the first memory bank comprises writing the write data stored in the first data latch to the first memory page and writing the read data stored in the second data latch to the third memory page during the erase phase and the program phase.

17. The memory system of claim 16, wherein in response to the first command being issued during the sensing phase of the write operation in progress, the memory device terminates the write operation after completion of the sensing phase and the controller device issues the second command after the write operation in progress completes the sensing phase.

18. The memory system of claim 17, wherein the memory device retrieves stored data from the second memory page of the first memory bank in response to the second command and stores the read data in the first data latch.

19. The memory system of claim 18, wherein subsequent to the read operation to the second memory page of the first memory bank being completed, the controller device issues the third command with associated write data to the memory device to resume the write operation previously in progress at the first memory page of the first memory bank at the start of the set-up stage of the erase phase, the write data being stored in the first data latch.

20. The memory system of claim 17, wherein the memory device retrieves stored data from the second memory page of the first memory bank in response to the second command and stores the read data in a third data latch.

21. The memory system of claim 20, wherein subsequent to the read operation to the second memory page of the first memory bank being completed, the controller device issues the third command without associated write data to the memory device to resume the write operation previously in progress at the first memory page of the first memory bank at the start of the set-up stage of the erase phase, the write operation using the write data being stored and remaining in the first data latch.

22. The memory system of claim 1, wherein a memory page comprises 512 bits of data.

23. The memory system of claim 1, wherein the memory device comprises the plurality of memory banks organized as a two-dimensional array of tiles formed on a semiconductor substrate, each tile comprising a three dimensional array of storage transistors arranged in a plurality of NOR memory strings and a modular control circuit comprising support circuitry for operating the storage transistors.

24. The memory system of claim 23, wherein the memory device comprises a quasi-volatile memory device.

25. A memory system, comprising:

a memory device comprising an array of storage transistors for storing data, the storage transistors being organized in a plurality of memory banks, each memory bank comprising a plurality of memory pages; and a controller device configured to interact with the memory device to perform read and write operations, each read or write operation being performed on a memory page in a memory bank, wherein the controller device is configured to issue to the memory device a write command and a write termination command, the write command causing the memory device to initiate a write operation in the memory device and the write termination command causing the memory device to terminate the memory operation, and wherein in response to a write operation being in progress at a first memory page in a first memory bank of the memory device and further in response to the controller device receiving a request for read data from a second memory page in the first memory bank, the controller device issues the write termination command to terminate the write operation in progress; and wherein each of the write operations comprises an erase phase followed by a program phase, each of the erase phase and the program phase comprises a set-up stage and a voltage pulse stage, and wherein in response to a first write command being issued to the memory device at a given memory page of a given memory bank to initiate a second write operation, the controller device tracks the phase of the second write operation being performed at the given memory page of the given memory bank of the memory device.

26. The memory system of claim 25, wherein the controller device is further configured to issue to the memory device a resume write command, the resume write command causing the memory device to resume the write operation that was previously terminated by the write termination command.

27. A method in a system in which a memory controller interacts with a memory device to perform read and write operations at the memory device, the memory device including storage transistors organized in a plurality of memory banks, each memory bank including a plurality of memory pages and each read or write operation being performed on a memory page in a memory bank, the method comprising:

receiving, at the memory device, a first command being a write command and write data from the memory controller to perform a write operation at the memory device, the write command comprising at least a memory address specifying a first memory page of a first memory bank in the memory device at which the write data is to be stored;

receiving, at the memory controller, a request for read data from a second memory page of the first memory bank;

in response to receiving the request for read data for the first memory bank, determining, at the memory controller, the write operation associated with the first command at the first memory bank is in progress;

in response to determining the write operation at the first memory bank is in progress, receiving, at the memory device, a second command from the memory controller to terminate the write operation in progress at the first memory bank of the memory device; and subsequent to terminating the write operation, receiving, at the memory device, a third command from the memory controller to read data from the second memory page of the first memory bank of the memory device, and wherein each of the write operations comprises an erase phase followed by a program phase, each of the erase phase and the program phase comprises a set-up stage and a voltage pulse stage, and the method further comprises, in response to a first write command being issued to the memory device from the memory controller at a given memory page of a given memory bank to initiate a second write operation, tracking at the memory controller the phase of the second write operation being performed at the given memory page of the given memory bank of the memory device.

28. The method of claim 27, further comprising:

subsequent to the read operation to the first memory bank being completed, receiving, at the memory device, a fourth command from the memory controller to resume the write operation previously in progress at the first memory page of the first memory bank.

29. The method of claim 28, wherein receiving the fourth command comprises receiving the fourth command with the write data.

30. The method of claim 28, wherein receiving the fourth command comprises receiving the fourth command without the write data, the write operation being performed using the write data previously sent with the first command.

31. A method in a memory device in which the memory device interacts with a memory controller to perform read and write operations at the memory device, the memory device including storage transistors organized in a plurality of memory banks, each memory bank including a plurality of memory pages and each read or write operation being performed on a memory page in a memory bank, the method comprising:

receiving a first command being a write command and write data from the memory controller to perform a write operation at the memory device, the write command comprising at least a memory address specifying a first memory page of a first memory bank in the memory device at which the write data is to be stored;

while the write operation is in progress at the first memory bank of the memory device, receiving a second command from the memory controller to terminate the write operation in progress at the first memory bank; and subsequent to terminating the write operation, receiving a third command from the memory controller to read data from a second memory page of the first memory bank of the memory device, and wherein each of the write operations comprises an erase phase followed by a program phase, each of the erase phase and the program phase comprises a set-up stage and a voltage pulse stage, and the method further comprises, in response to a first write command being issued to the memory device from the memory controller at a given memory page of a given memory bank to initiate a second write operation, tracking at the memory controller the phase of the second write operation being performed at the given memory page of the given memory bank of the memory device.

32. The method of claim 31, further comprising:

subsequent to the read operation to the first memory bank being completed, receiving a fourth command to resume the write operation previously in progress at the first memory page of the first memory bank.

33. The method of claim 32, wherein receiving the fourth command comprises receiving the fourth command with the write data.

34. The method of claim 32, wherein receiving the fourth command comprises receiving the fourth command without the write data, the write operation being performed using the write data previously sent with the first command.

35. A method in a memory controller in which the memory controller interacts with a memory device to perform read and write operations at the memory device, the memory device including storage transistors organized in a plurality of memory banks, each memory bank including a plurality of memory pages and each read or write operation being performed on a memory page in a memory bank, the method comprising:

issuing a first command being a write command with write data to the memory device to perform a write operation at the memory device, the write command comprising at least a memory address specifying a first memory page of a first memory bank in the memory device at which the write data is to be stored;

receiving a request for read data from a second memory page of the first memory bank;

determining the write operation associated with the first command at the first memory bank is in progress;

issuing a second command to the memory device to terminate the write operation in progress at the first memory bank; and subsequent to terminating the write operation, issuing a third command to the memory device to read data from the second memory page of the first memory bank of the memory device, and wherein each of the write operations comprises an erase phase followed by a program phase, each of the erase phase and the program phase comprises a set-up stage and a voltage pulse stage, and the method further comprises, in response to a first write command being issued to the memory device from the memory controller at a given memory page of a given memory bank to initiate a second write operation, tracking at the memory controller the phase of the second write operation being performed at the given memory page of the given memory bank of the memory device.

36. The method of claim 35, further comprising:

subsequent to the read operation to the first memory bank being completed, issuing a fourth command to the memory device to resume the write operation previously in progress at the first memory page of the first memory bank.

37. The method of claim 36, wherein receiving the fourth command comprises receiving the fourth command with the write data.

38. The method of claim 36, wherein receiving the fourth command comprises receiving the fourth command without the write data, the write operation being performed using the write data previously sent with the first command.

\* \* \* \* \*